United States Patent
Li et al.

(10) Patent No.: US 10,050,754 B2
(45) Date of Patent: Aug. 14, 2018

(54) DEVICE AND METHOD FOR TRANSMITTING REFERENCE SIGNAL IN MULTI-ANTENNA SYSTEM

(71) Applicant: Pantech Inc., Seoul (KR)

(72) Inventors: Jian Jun Li, Seoul (KR); Kyoung Min Park, Seoul (KR)

(73) Assignee: Pantech Inc., Seoul (KR)

( * ) Notice: Subject to any disclaimer, the term of this patent is extended or adjusted under 35 U.S.C. 154(b) by 105 days.

(21) Appl. No.: 14/440,581

(22) PCT Filed: Oct. 17, 2013

(86) PCT No.: PCT/KR2013/009299
§ 371 (c)(1),
(2) Date: May 4, 2015

(87) PCT Pub. No.: WO2014/069821
PCT Pub. Date: May 8, 2014

(65) Prior Publication Data
US 2015/0288497 A1    Oct. 8, 2015

(30) Foreign Application Priority Data
Nov. 2, 2012    (KR) .......................... 10-2012-0123583

(51) Int. Cl.
*H04L 5/00* (2006.01)
*H04B 7/04* (2017.01)
(Continued)

(52) U.S. Cl.
CPC ......... *H04L 5/0048* (2013.01); *H04B 7/0413* (2013.01); *H04B 7/0478* (2013.01);
(Continued)

(58) Field of Classification Search
None
See application file for complete search history.

(56) References Cited

U.S. PATENT DOCUMENTS

2011/0116563 A1    5/2011    Vitthaladevuni et al.
2011/0317657 A1*   12/2011   Chmiel ................... H04L 5/001
                                                               370/331
(Continued)

FOREIGN PATENT DOCUMENTS

KR    10-2010-0138261    12/2010
KR    10-2012-0002875    1/2012
KR    10-2012-0003781    1/2012

OTHER PUBLICATIONS

Thien-Toan Tran, et al., "Overview of enabling technologies for 3GPP LTE-advanced", EURASP Journal on Wireless Communications and Networking, 2012, pp. 1-12.
(Continued)

*Primary Examiner* — Faruk Hamza
*Assistant Examiner* — Cassandra Decker
(74) *Attorney, Agent, or Firm* — H.C. Park & Associates, PLC

(57) ABSTRACT

The present invention relates to a device and a method for transmitting a reference signal in a multi-antenna system. The present specification discloses a method for receiving a reference signal, the method comprising the steps of: receiving, from a base station, first channel state information (CSI) reference signal (CSI-RS) configuration information including individual parameters necessary when a terminal receives a first CSI-RS from a horizontally adjacent horizontal representative antenna among the all of the transmission antennas of the base station and second CSI-RS configuration information including individual parameters necessary when the terminal receives a second CSI-RS from a vertically adjacent vertical representative antenna; and receiving the respective first and second CSI-RSs from the base station on the basis of the first CSI-RS configuration
(Continued)

information and the second CSI-RS configuration information.

11 Claims, 12 Drawing Sheets

(51) Int. Cl.
  *H04B 7/06* (2006.01)
  *H04W 88/08* (2009.01)
  *H04W 88/02* (2009.01)
  *H04B 7/0413* (2017.01)
  *H04B 7/0456* (2017.01)

(52) U.S. Cl.
  CPC ......... *H04B 7/0639* (2013.01); *H04B 7/0647* (2013.01); *H04L 5/0023* (2013.01); *H04L 5/0094* (2013.01); *H04W 88/02* (2013.01); *H04W 88/08* (2013.01)

(56) References Cited

U.S. PATENT DOCUMENTS

| | | |
|---|---|---|
| 2012/0108254 A1 | 5/2012 | Kwon et al. |
| 2013/0107849 A1 | 5/2013 | Park |
| 2013/0114763 A1 | 5/2013 | Park |
| 2013/0242778 A1* | 9/2013 | Geirhofer ............. H04L 1/0026 370/252 |
| 2013/0258964 A1* | 10/2013 | Nam ................... H04W 72/046 370/329 |
| 2013/0308714 A1* | 11/2013 | Xu ....................... H04B 7/0417 375/267 |
| 2013/0308715 A1* | 11/2013 | Nam ................... H04B 7/0469 375/267 |
| 2013/0322376 A1* | 12/2013 | Marinier ............... H04W 72/06 370/329 |
| 2013/0329664 A1* | 12/2013 | Kim ...................... H04W 24/10 370/329 |
| 2013/0343317 A1* | 12/2013 | Etemad ................. H04B 7/024 370/329 |
| 2014/0003240 A1* | 1/2014 | Chen .................... H04W 28/08 370/235 |
| 2014/0016549 A1* | 1/2014 | Novlan ................ H04B 7/0417 370/328 |
| 2014/0098689 A1* | 4/2014 | Lee ..................... H04B 7/0469 370/252 |

OTHER PUBLICATIONS

International Search Report dated Jan. 22, 2014, in International Application No. PCT/KR2013/009299.
Written Opinion dated Jan. 22, 2014, in International Application No. PCT/KR2013/009299.

* cited by examiner

DEVICE AND METHOD FOR TRANSMITTING REFERENCE SIGNAL IN MULTI-ANTENNA SYSTEM

CROSS-REFERENCE TO RELATED APPLICATIONS

This application is the National Stage Entry of International Application PCT/KR2013/009299, filed on Oct. 17, 2013, and claims priority from and the benefit of Korean Patent Application No. 10-2012-0123583, filed on Nov. 2, 2012, both of which are incorporated herein by reference for all purposes as if fully set forth herein.

BACKGROUND

Field

The present invention relates to wireless communication, and more particularly, to an apparatus and a method for transmitting a reference signal in a multiple antenna system.

Discussion of the Background

An existing mobile communication system may support 8 transmission antennas for a beamforming operation. Particularly, in a multi-user Multiple Input Multiple Output (MIMO) operation, the same physical resource block (PRB) may be scheduled or assigned to maximum 4 user equipment (UE). Associated with a configuration of an antenna in a next generation mobile communication system, for example, a closely-spaced X-polarized antenna of 0.5λ to 0.7λ is considered.

Meanwhile, a next generation mobile communication system is aimed at supporting maximum 64 transmission antennas as a two-dimensional antenna arrangement associated with a closed loop (CL) MIMO. However, if 64 transmission antennas are stably supported, overhead of a control signal is increased. An important consideration is to design for minimizing a channel state information-reference signal (CSI-RS) being a reference signal for estimating a channel state in a wireless communication system supporting 64 transmission antennas, a precoding matrix indicator (PMI) feedback, a demodulation reference signal (DMRS) being a reference signal for data demodulation. However, there is no methods for minimizing overhead of a control in addition to increase in the number of transmission antennas.

SUMMARY

The present invention has been made in view of the above problems to provide an apparatus and a method for transmitting a reference signal (RS) in a multiple antenna system.

The present invention further provides an apparatus and a method for transmitting a CSI-RS through a vertical representative antenna and a horizontal representative antenna.

The present invention further provides an apparatus and a method for transmitting a double precoding matrix indicator (PMI) corresponding to a double CSI-RS.

The present invention further provides an apparatus and a method for transmitting individual configuration information and common configuration information associated with transmission of the double CSI-RS.

The present invention further provides an apparatus and a method for transmitting a CSI-RS corresponding bit map indicating a CSI-RS pattern corresponding to q antenna port units.

The present invention further provides an apparatus and a method for generating a DMRS sequence giving orthogonality between DMRSs using the number of resource elements.

In accordance with an aspect of the present invention, there is provided a method of receiving a reference signal (RS) by user equipment (UE) in a multiple antenna system, the method including: receiving first channel state information (CSI-RS) configuration information including an individual parameter necessary to receive the first CSI-RS from an adjacent horizontal representative antenna and second CSI-RS configuration information including the individual parameter necessary to receive the second CSI-RS from an adjacent vertical representative antenna among entire transmission antennas of a base station from a base station by the UE; and receiving the first CSI-RS and the second CSI-RS based on the first and second CSI-RS configuration information.

In accordance with another aspect of the present invention, there is provided user equipment (UE) for receiving a reference signal (RS) in a multiple antenna system, the UE including: a receiver to receive first channel state information (CSI-RS) configuration information including an individual parameter necessary to receive the first CSI-RS from an adjacent horizontal representative antenna and second CSI-RS configuration information including the individual parameter necessary to receive the second CSI-RS from an adjacent vertical representative antenna among entire transmission antennas of a base station from a base station; and a channel estimator to reconfigure a CSI-RS configuration regarding the UE based on the first and second CSI-RS configuration information, wherein the receiver receives the first CSI-RS and the second CSI-RS based on the first and second CSI-RS configuration information from the base station.

When the next generation mobile communication system transmits a CSI-RS with respect to 64 transmission antennas, CSI-RS transmission overhead may be reduced while maintaining system performance, and beamforming in a forward direction is possible with minimum overhead.

DETAILED DESCRIPTION OF THE ILLUSTRATED EMBODIMENTS

Exemplary embodiments of the present invention are described with reference to the accompanying drawings in detail. The above objects, features, and advantages can be more clearly comprehended through the following description in relation to accompanying drawings. Accordingly, those skilled in the art can easily realize the present inventive concept. In the following description, if detailed description about well-known functions or configurations may make the subject matter of the disclosure unclear, the detailed description will be omitted.

The following description will be made while focusing on a wireless communication network. A system (e.g., base station) controlling a corresponding wireless communication network controls a network and transmits data or an operation performed in the wireless communication network may be implemented by a UE combined with a corresponding wireless network.

According to embodiments of the present invention, 'transmit a channel' may be integrated as a meaning to transmit information through a specific channel. The channel includes both of a control channel and a data channel. For example, the control channel may include a Physical Downlink Control Channel (PDCCH) or a Physical Uplink Control Channel (PUCCH). The data channel may include a Physical Downlink Shared CHannel (PDSCH) or a Physical Uplink Shared CHannel (PUSCH).

Figure 1:
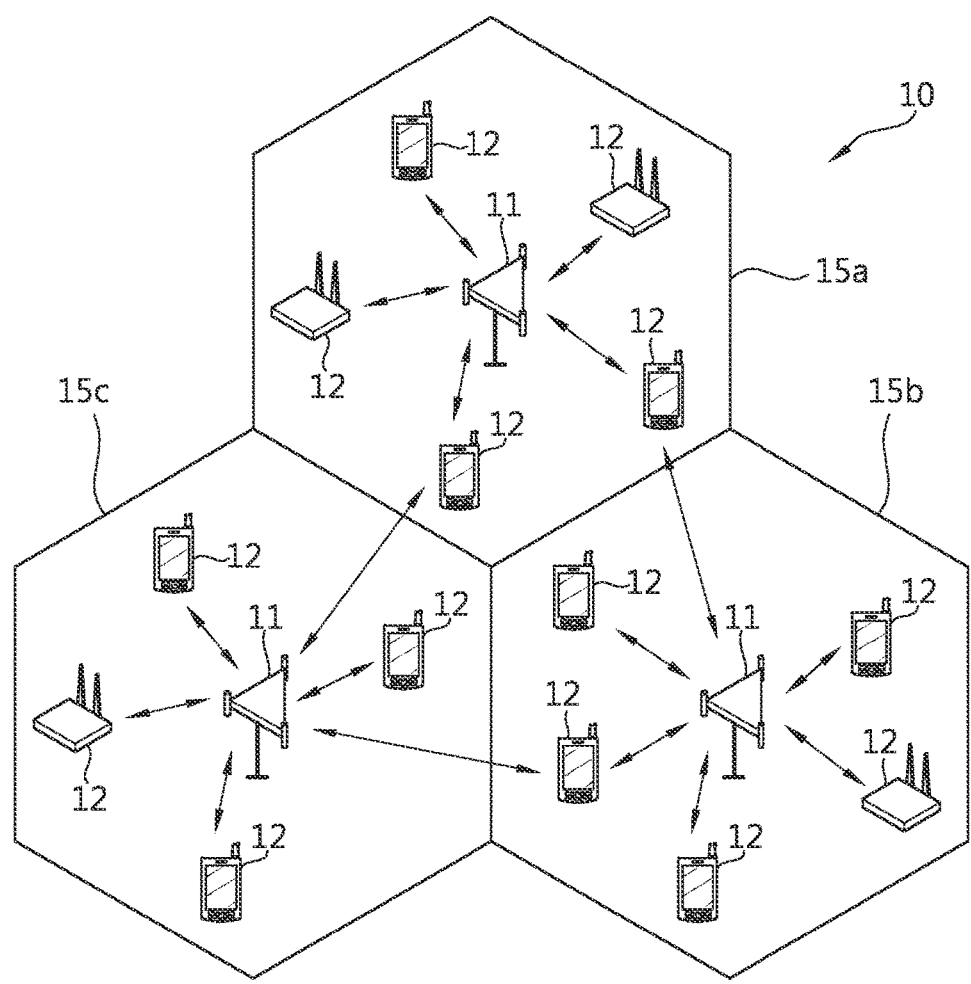
FIG. 1 is a diagram illustrating a wireless communication system according to the present invention.

FIG. 1 is a diagram illustrating a wireless communication system according to the present invention.

Referring to FIG. 1, a wireless communication system 10 is widely disposed to provide various communication services such as voice and packet data. The wireless communication system 10 includes a least one base station (BS). Each base station 11 provides a communication service with respect to cells 15a, 15b, and 15c. One base station may control a plurality of cells. In the present invention, the base station 11 means a transmission/reception end to share information with the UE and control information for cellular communication. The base station may refer to other terms such as an evolved-NodeB (eNB), a Base Transceiver System (BTS), an access point), a femto base station, a home nodeB, and a relay. A cell includes various coverage zones such as a mega cell, a macro cell, a micro cell, a pico cell, and a femto cell.

The user equipment (UE) 12 may be fixed or may have mobility. The UE may refer to other terms such as a mobile station (MS), a mobile terminal (MT), a user terminal (UT), a subscriber station (SS), a wireless device, a personal digital assistant (PDA), a wireless modem, and a handheld device.

Hereinafter, downlink means a transmission link in a direction to the UE 12 from the base station 11. Uplink means transmission link in a direction to the base station 11 from the UE 12. In the downlink, a transmitter may be a part of the base station 11, and a receiver may be a part of the UE 12. In the downlink, the transmitter may be a part of the UE 12 and the receiver may be a part of the base station 11. There are no limitations on a multiple access scheme applied to the wireless communication system. Various multiple access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA may be used. The uplink transmission and the downlink transmission may use a TDD (Time Division Duplex) scheme where data are transmitted using different times, and a FDD (Frequency Division Duplex) scheme where data are transmitted using different frequencies.

Layers of a radio interface protocol between the UE 12 and the base station 11 may be classified into a first layer L1, a second layer L2, and a third layer L3 based on lower three layers of an Open System Interconnection (OSI) model which is well known in a communication system. Among them, a physical layer included in the first layer provides an information transfer service using a physical channel. Several physical channels are used in the physical layer.

A physical downlink control channel (hereinafter referred to as 'PDCCH') may carry resource assignment and transmission format of a Downlink Shared Channel (DL-SCH), resource assignment information of a Uplink Shared Channel (UL-SCH), resource assignment of an upper layer control message such as random access response transmitted on the physical downlink shared channel (PDSCH), and a group of transmission power control (TPC) command with respect to individual UEs in an optional UE group. A plurality of PDCCHs may be transmitted in a control zone. The UE may monitor a plurality of PDCCHs.

Control information of a physical layer mapped to the PDCCH refers to downlink control information (hereinafter referred to as 'DCI'). That is, the DCI is transmitted through the PDCCH. The DCI may include uplink or downlink resource assignment field, uplink transmission power control command field, a control field for paging, and a control field for indicating random access (RA) response.

A use purpose of the DCI and a field defined in the DCI are changed according to a format thereof. A following table represents a DCI according to various formats.

TABLE 1

| DCI formats | Description |
| --- | --- |
| 0 | Used for scheduling PUSCH |
| 1 | used for scheduling one PDSCH codeword in one cell |
| 1A | used to simply schedule one PDSCH codeword in one cell and for a random access process for initializing one PDSCH codeword in one cell according to a PDCCH command |
| 1B | used to simply schedule one PDSCH codeword in one cell using precoding information |
| 1C | used to compact schedule one PDSCH codeword and notify MCCH change |
| 1D | used to compact schedule one PDSCH codeword in one cell including precoding and power offset information |
| 2 | used in PDSCH scheduling with respect to UE configured in a spatial multiplexing mode |
| 2A | used in PDSCH of UE configured in a CDD mode of large delay |
| 2B | used in a transmission mode 8 (double layer transmission) |
| 2C | used in a transmission mode 9 (double layer transmission) |
| 3 | used to transmit a TPC command for PUCCH and PUSCH including power adjustment of 2 bits |
| 3A | used to transmit a TPC command for PUCCH and PUSCH including power adjustment of a single bit |
| 4 | Used to schedule PUSCH (uplink grant). Particularly, format 4 is used for PUSCH scheduling with respect to UE configured in a spatial multiplexing mode. |

Referring to the table 1, a DCI format 0 represents uplink scheduling information. A DCI format 1 is used to schedule one PDSCH codeword. A DCI format 1A is used to compactly schedule one PDSCH codeword. A DCI format 1C is used to very compactly schedule the DL-SCH. A DCI format 2 is used for PDSCH scheduling in a spatial multiplexing mode. A DCI format 2A is used for PDSCH scheduling in a spatial multiplexing mode. DCI formats 3 and 3A are used to transmit Transmission Power Control (TPC) for an uplink channel.

Each field of the DCI is sequentially mapped to n information bits $a_0$ to $a_{n-1}$. For example, if the DCI is mapped to an information bit of total 44 bit lengths, each field of the DCI is sequentially mapped to n information bits $a_0$ to $a_{43}$. The formats 0, 1A, 3, and 3A may have the same payload size. The DCI format 0 may refer to an uplink grant.

The wireless communication system 10 may be a multiple antenna system. The multiple antenna system may refer to a multiple-input multiple-output (MIMO) system. Alternatively, the multiple antenna system may refer to a multiple-input single-output (MISO) system, a single-input single-output (SISO) system, or a single-input multiple-output (SIMO) system. The MIMO system uses a plurality of transmission antennas and a plurality of reception antennas. The MISO system uses a plurality of transmission antennas and one reception antenna. The SISO system uses one transmission antenna and one reception antenna. The SIMO system uses one transmission antenna and a plurality of reception antennas.

A multiple antenna transmission/reception scheme used for an operation of the multiple antenna system may use frequency switched transmit diversity (FSTD), a Space Frequency Block Code (SFBC), a Space Time Block Code (STBC), Cyclic Delay Diversity (CDD), and time switched transmit diversity (TSTD).

The wireless communication system 10 needs to estimate an uplink channel or a downlink channel for transmission/reception of data, system synchronization acquisition, and channel information feedback. A process of recovering a transmission signal by compensating for distortion of a signal generated due to rapid change in a channel environment refers to channel estimation. Further, there is also a need to measure a channel state with respect to a cell in which the UE 12 is included and other cells. In general, for channel estimation or channel state measurement, the UE 120 and the base station 11 use a Reference Signal (RS) which is known to the UE 12 and the base station 11.

Since the UE 12 knows information on the RS, the UE 12 may estimate a channel and compensate for a channel value based on a received RS to exactly acquire data provided from the base station 11. If a reference signal provided from the base station 11 is p, channel information generated when the RS is transmitted is h, heat noise generated from the UE 12) is n, and a signal received by the UE 12 is y, y=h·p+n. In this case, since the reference signal p is known to the UE 12, when a Least Square (LS) scheme is used, channel information may be estimated by a following equation 1.

$$\hat{h} = \frac{y}{p} = h + \frac{n}{p} = h + \hat{n}$$ [Equation 1]

Where, since a channel estimation value $\hat{h}$ estimated using the reference signal depends on $\hat{n}$, there is a need to converge $\hat{n}$ to 0 in order to estimate an exact h. The channel may be estimated by minimizing an influence of the $\hat{n}$ using a large number of reference signals.

The reference signal may be assigned to all sub-carrier waves, and may be assigned between data sub-carriers transmitting data. In a scheme of allocating the reference signal to all sub-carriers, in order to acquire channel estimation performance, a specific transmitting timing signal includes only a reference signal such as a preamble. A transmission amount of data may be increased between data sub-carriers according to a scheme of allocating the reference signal. The multiple antenna system does not use a resource element in another antenna which is used in order one antenna for transmitting a reference signal for the purpose of not interfering between antennas.

The downlink reference signal includes a Channel State Information reference signal (CSI-RS) and a DMRS. Since transmission pattern and configuration information are changed according to the reference signal, a method for transmitting each reference signal in a multiple antenna system will be now described.

1. CSI-RS

The CSI-RS may be used to estimate channel state information. The CSI-RS is disposed at a frequency domain and a time domain. If necessary, through estimation of the channel state using the CSI-RS, a Channel Quality Indicator (CQI), a Precoding Matrix Indicator (PMI), and a Rank Indicator (RI) may be reported to the UE as channel state information.

The wireless communication system may be operated according to various transmission modes. For example, a transmission mode 0 may be a mode to support only a single antenna port. A transmission mode 9 may be a mode to support 8 antenna ports. In this case, definition of the antenna port is as follows.

When the first symbol (or signal) is conveyed through a first channel and a second symbol (or signal) is conveyed through a second channel, simultaneous conveyance of the first symbol (or signal) so that the first channel is induced by the second channel is defined as an antenna port (An antenna port is defined such that the channel over which a symbol on the antenna port is conveyed can be inferred from the channel over which another symbol on the same antenna port is conveyed).

One unique resource grid is present at one antenna port. Each element in the resource grid for an antenna port p refers to a resource element (RE). Each resource element is identified by an index pair (k,l) in every slot. In this case, k= 0, . . . , $N^{DL}_{RB}N^{RB}_{sc}-1$, l=0, . . . , $N^{DL}_{symb-1}$, k represents a sub-carrier index in a frequency domain, and l represents a symbol index at a time domain. The resource element represents the minimum frequency-time unit to which a modulation symbol of the data channel or a modulation channel of a control channel is mapped. If M sub-carriers are included in one OFDM symbol and one slot includes N OFDM symbols, one slot include a total (M ×N) resource elements.

In the multiple antenna system, different antenna ports may be mapped to each physical antenna. For example, antenna ports 0~3 may be sequentially mapped to four physical antennas.

Figure 2:
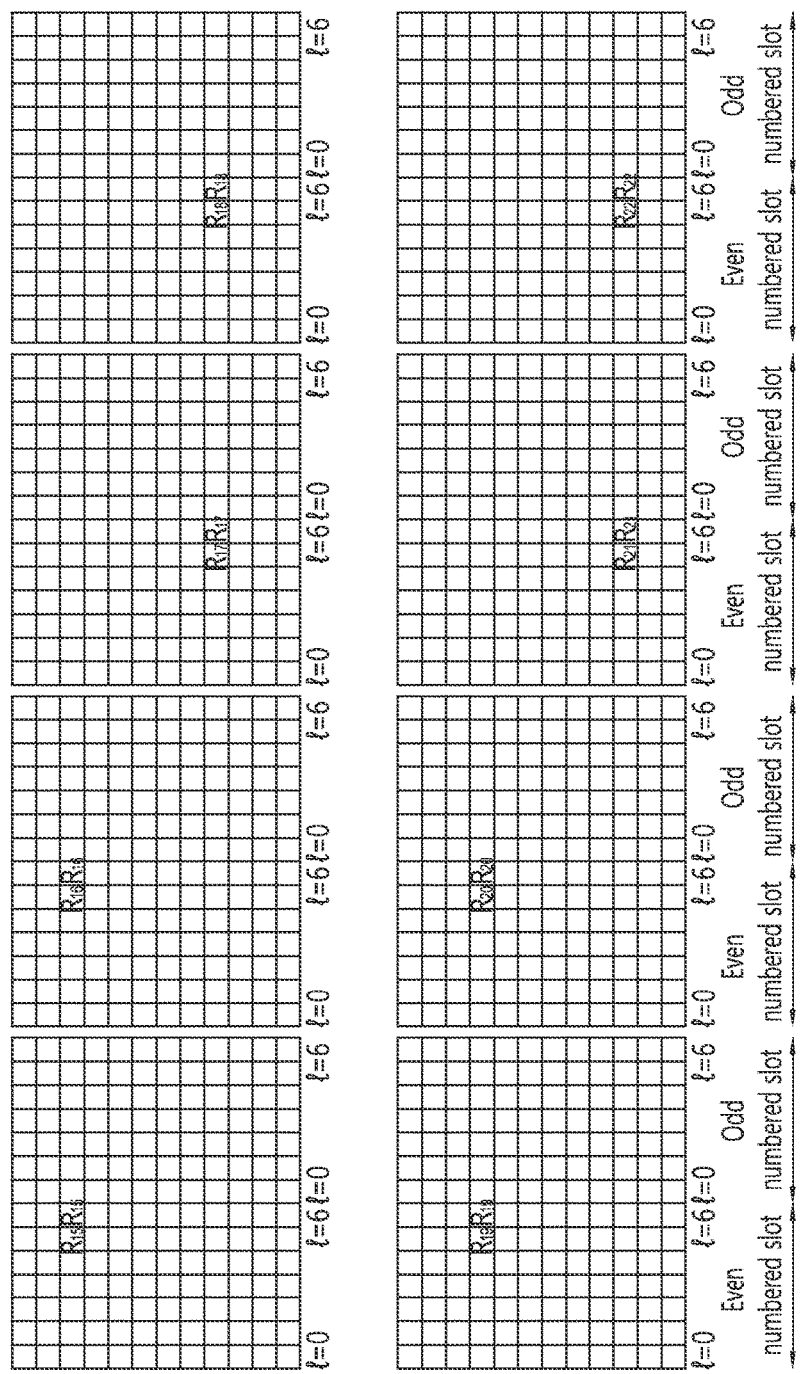
FIG. 2 and FIG. 3 are diagrams illustrating a CSI-RS pattern according to an example of the present invention.
Figure 3:
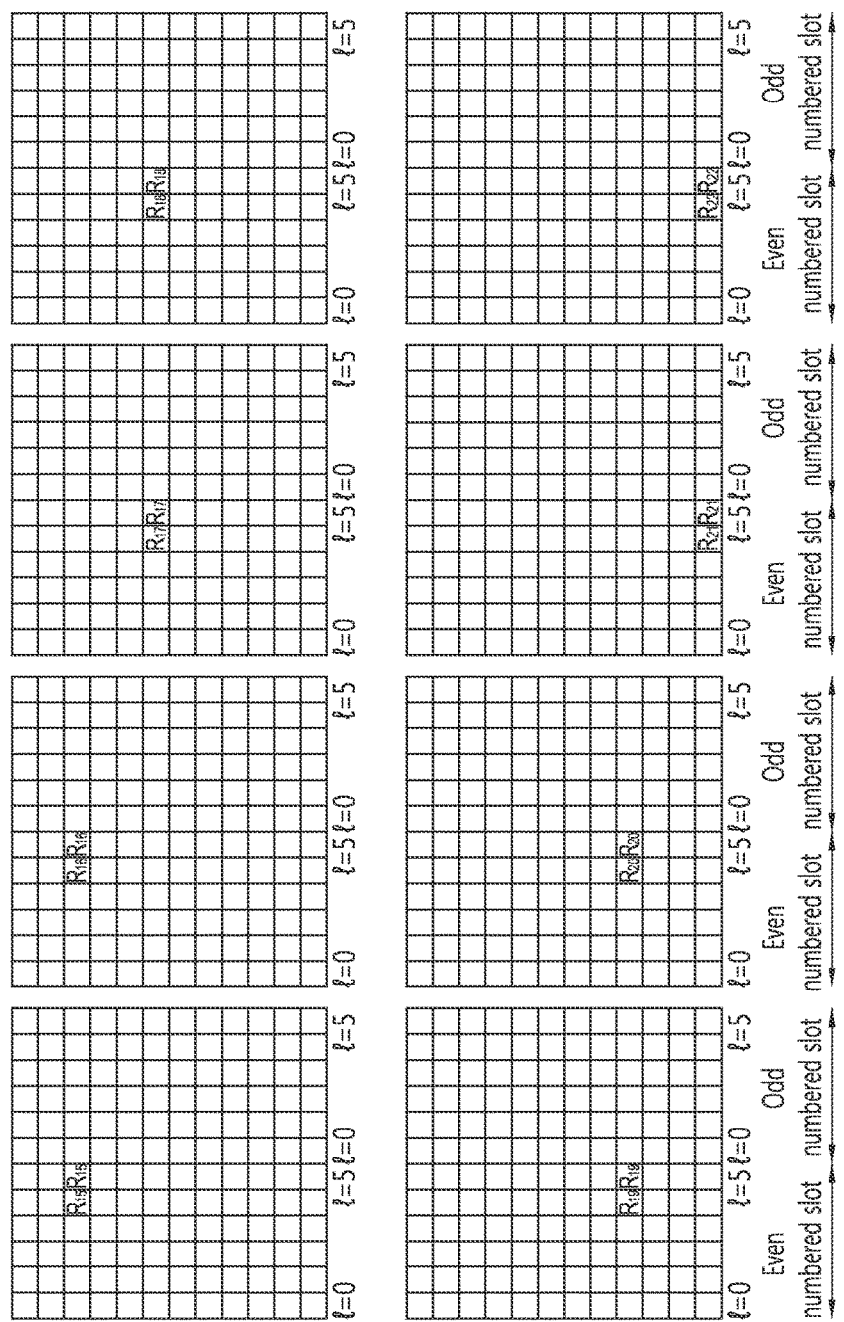

The number of antenna ports and a unique resource grid of each antenna port are determined depending on reference signal configuration in a cell. For example, when a total number of the physical antennas is 64, the number of antenna ports supporting the CSI-RS may be defined as one of {1, 2, 4, 8, 16, 32, 64} according to a scheme of arranging a configuration of the CSI-RS and a CSI-RS port at a physical antenna. As illustrated in FIG. 2 or FIG. 3, a unique pattern conveying the CSI-RS may be provided every antenna port. Hereinafter, a unique pattern where an antenna pattern conveys the CSI-RS or a pattern where the CSI-RS is mapped to the resource element refers to a CSI-RS pattern.

FIG. 2 and FIG. 3 are diagrams illustrating a CSI-RS pattern according to an example of the present invention. FIG. 2 illustrates an example of mapping a CSI-RS to the resource element in a case of a normal cyclic prefix (CP). FIG. 3 schematically illustrates an example of mapping the CSI-RS to the resource element in a case of an extended CP.

Figure 9:
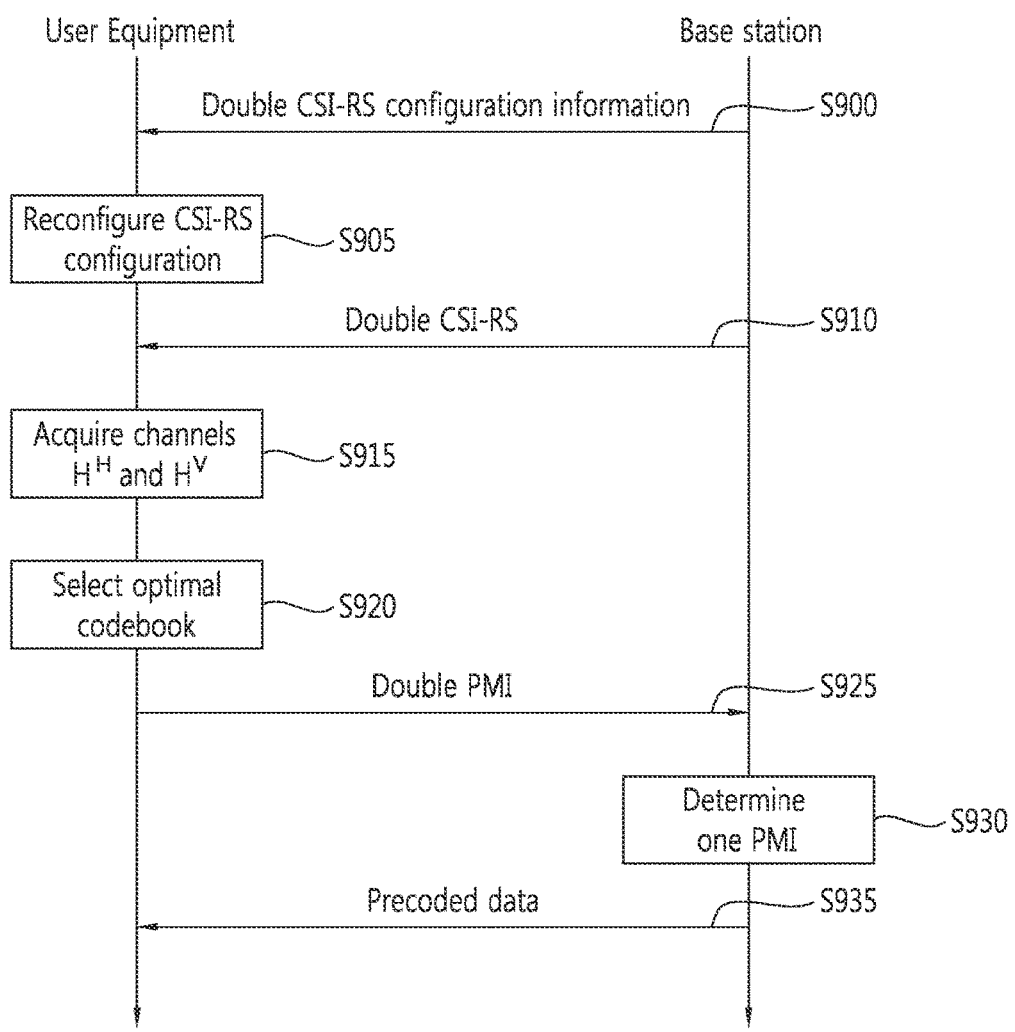
FIG. 9 is a scheme diagram illustrating a method for transmitting a CSI-RS according to an example of the present invention.

Referring to FIG. 2 and FIG. 3, Rp represents a resource element used to transmit the CSI-RS from an antenna port. For example, $R_{15}$ represents a CSI-RS transmitted from an antenna port 15. In FIG. 9, when one antenna port is supported, a CSI-RS pattern represents that the CSI-RS is mapped to resource elements (2, 5) and (2, 6) of the antenna port 15. Alternatively, if 8 antennas are supported in FIG. 2, the CSI-RS pattern indicates that the CSI-RS is mapped to resource elements (2, 5) and (2, 6) of antenna ports 15 and 16, resource elements (8, 5) and (8, 6) of antenna ports 17 and 18, resource elements (3, 5) and (3, 6) of antenna ports 19 and 20, and resource elements (9, 5) and (9, 6) of antenna ports 21 and 22.

In this way, a unique CSI-RS pattern is provided every the number of the antenna port. Examples of FIG. 2 and FIG. 3 define total eight antenna ports including antenna ports 15 to 22 to transmit the CSI-RS in a wireless communication system including eight physical antennas. However, this is illustrative purpose only and a case of a wireless communication system including 64 physical antennas may support 64 antenna ports. In this case, antenna ports transmitting the CSI-RS may be extended to antenna ports 15 to 63.

Figure 4:
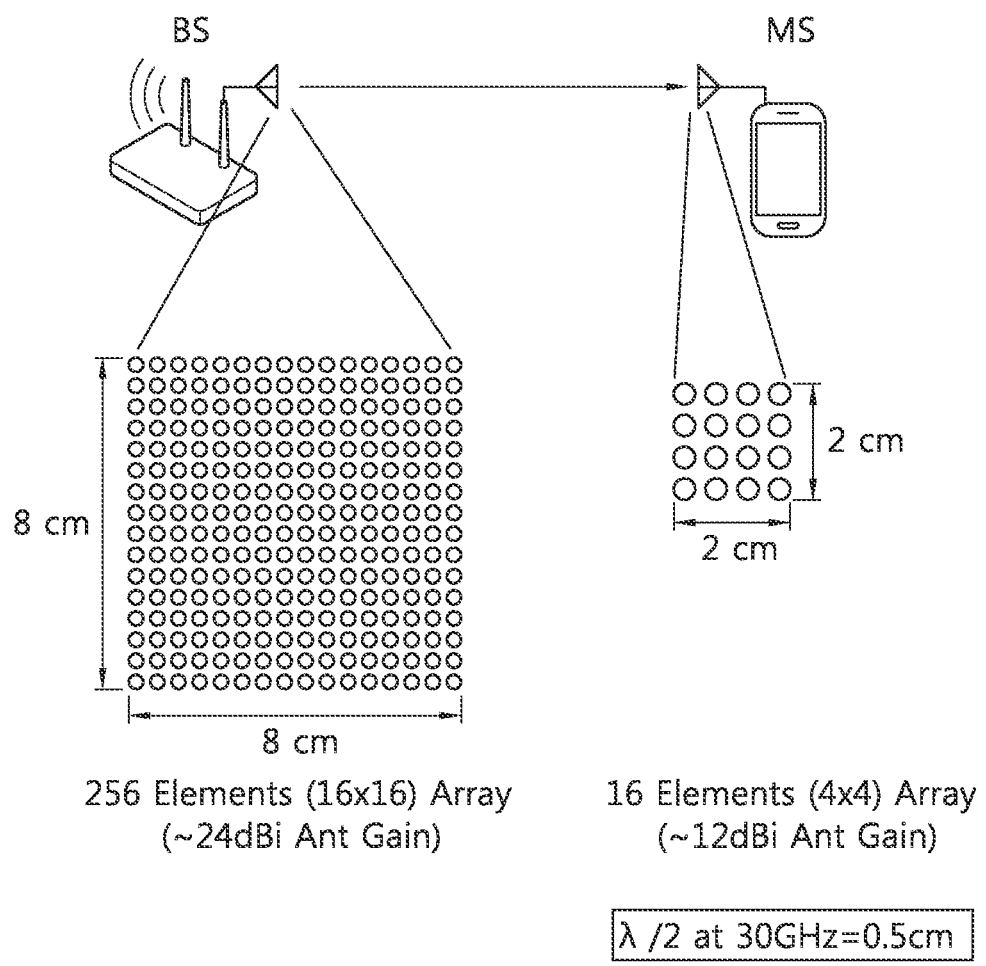
FIG. 4 is a diagram illustrating a multiple antenna system according to an example of the present invention.

FIG. 4 is a diagram illustrating a multiple antenna system according to an example of the present invention.

Referring to FIG. 4, the multiple antenna system 400 includes a base station 410 having a plurality of antennas and a UE 420 having a plurality of antennas. Unlike the related art supporting 1, 2, 4, or 8 antenna ports, the base station 410 supports total 64 antennas as a two-dimensional antenna array having at least eight antenna ports. For example, at least eight antenna ports supported from the base station 410 may be the number corresponding to one of {16, 32, 64} as an example. That is, the base station 410 may support an antenna port corresponding to a multiple of 8. In this case, when the base station supports a MU-MIMO operation, the base station 410 may support 10 UEs.

In this way, in order to improve a yield of the wireless communication system, the number of supported physical antennas is gradually increased. However, a CSI-RS is transmitted every antenna using different resources or an antenna port supporting the CSI-RS is increased proportional to increase of the physical antenna so that that overhead of the reference signal may be generated. Further, the overhead of the reference signal deteriorates the system. Accordingly, when the number of supportable physical antennas is many, there is a need for a method capable of efficiently reducing a transmission amount of the CSI-RS.

An embodiment defines at least one of physical antennas expected to have a similar channel state as a representative antenna for transmitting the CSI-RS, and implements a system to transmit the CSI-RS from only the representative antenna. That is, all physical antennas may not transmit the CSI-RS. However, when the representative antenna may represent channels of other antennas, it is important to suitably select the representative antenna. Further, when the number of supportable antennas is many so that channels of entire antennas is not sufficiently reflected by only the one representative antenna, a plurality of representative antennas may be defined. The representative antenna is described with reference to FIG. 5.

Figure 5:
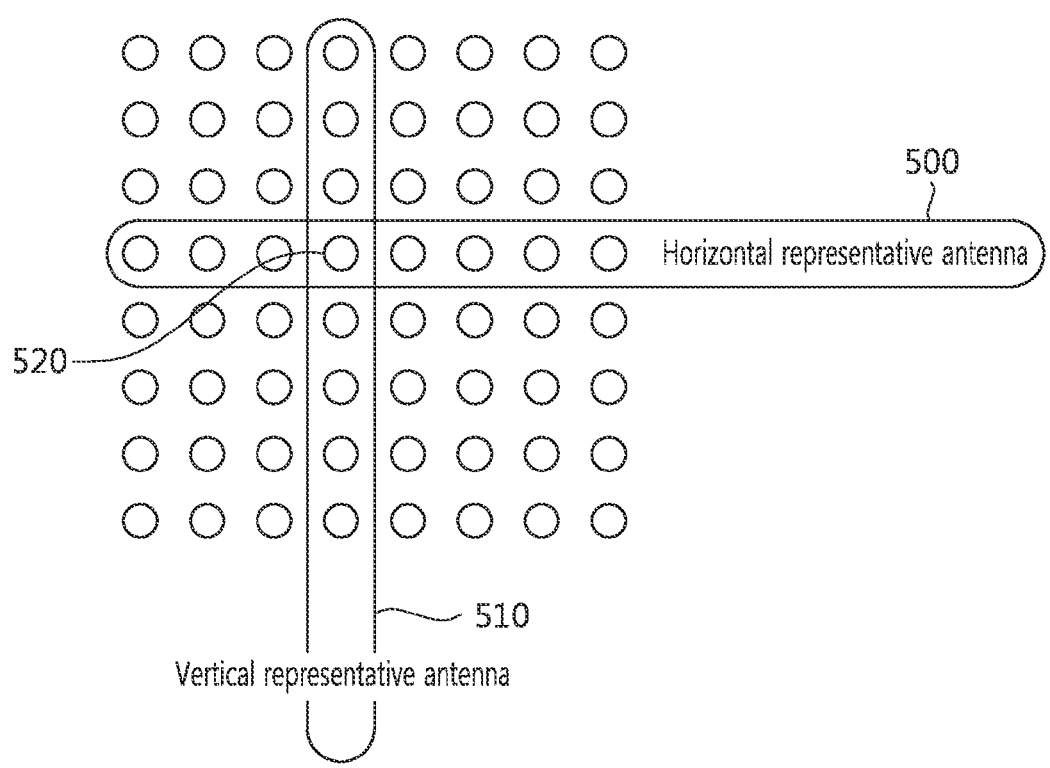
FIG. 5 is a diagram illustrating a representative antenna according to an example of the present invention.

FIG. 5 is a diagram illustrating a representative antenna according to an example of the present invention.

Referring to FIG. 5, 8×8 antennas are supported by a multiple antenna system. Total 64 physical antennas may transmit the CSI-RS. However, the present embodiment may select at least one represent antenna in order to reduce CSI-RS transmission overhead. For example, 8 physical antennas 500 close to an x axis direction and 8 physical antennas 500 close to a y axis direction may be selected as a representative antenna. In this case, total 16 representative antennas are defined. Further, there is a need for total 16 CSI-RS transmission antenna ports. The representative antenna close to the x axis direction may refer to a horizontal representative antenna. The representative antenna close to the y axis direction may refer to a vertical representative antenna. The horizontal representative antenna may be used to estimate channel information for beamforming in a horizontal direction. The vertical representative antenna may be used to estimate channel information for beamforming in a vertical direction. Antenna ports mapped to the horizontal representative antenna refer to a horizontal antenna port. Antenna ports mapped to the vertical representative antenna refer to a vertical antenna port.

According to the present embodiment, CSI-RSs may be divided into a CSI-RS1 transmitted from the horizontal antenna port and a CSI-RS1 transmitted from the vertical antenna port. The two types of CSI-RSs refer to a double CSI-RS. The double CSI-RS is applicable to a multiple dimension MIMO operation. That is, the base station may configure a double CSI-RS for the MIMO operation. A CSI-RS configured by non-zero power refers to a non-zero CSI-RS. The double CSI-RSs may be included in the non-zero CSI-RS.

Since antennas located above the horizontal representative antenna and antennas located under the horizontal representative antenna are very close to the horizontal representative antenna, the antennas have positional coherent relationship. Accordingly, the channel estimated based on the CSI-RS transmitted from the horizontal representative antenna may be estimated similar to a channel of the upper and lower antennas. In the same manner, channels of antennas located at a left side of the vertical representative antenna and antennas located at a right side of the vertical representative antenna may be estimated similar to the channel estimated based on the CSI-RS transmitted from the vertical representative antenna.

If the number of horizontal antenna ports is N1 and the number of vertical antenna ports is N2, the total number of antenna ports transmitting the CSI-RS is N1×N2. 8 being the number of the horizontal antenna ports and the vertical antenna ports is illustrative purpose only and the number of antenna ports of each direction may be one of {1, 2, 4, 8}. Accordingly, the total number of possible antenna ports is {1, 2, 4, 8, 16, 32, 64}. Further, the number of antenna ports of each direction is the same as the number of supportable antenna ports from a wireless communication system of a previous version. This is for the purposed of being compatible with a previous wireless communication system.

In this way, when the representative antenna is arranged in a cross pattern, other adjacent antennas may estimate a channel due to a correlation with the representative antenna without transmitting the CSI-RS. Accordingly, the transmission amount of the CSI-RS may be reduced while minimizing degradation in performance of the system.

In order to receive the CSI-RS from the base station, the UE should firstly know a configuration of the CSI-RS. To this end, the base station transmits CSI-RS configuration information to the UE. The UE should read the CSI-RS configuration information, confirm whether to transmit a CSI-RS any CSI-RS pattern with several antenna ports, and prepare reception of the CSI-RS.

According to the present invention, there is a need for CSI-RS configuration information when the base station transmits a double CSI-RS through representative antennas arranged on a two-dimensional plane. Hereinafter, double CSI-RS configuration information used to transmit the double CSI-RS through the representative antenna arranged on the two-dimensional plane will be described. Since the representative antenna is located in a horizontal direction and a vertical direction on the two-dimensional plane, the double CSI-RS configuration information with respect to the representative antenna may be individually determined every direction.

For example, the double CSI-RS configuration information includes individual CSI-RS configuration information individually defined with respect to the horizontal antenna port and the vertical antenna port and common CSI-RS configuration information commonly defined in the horizontal antenna port and the vertical antenna port.

First, the individual CSI-RS configuration information may be classified into individual CSI-RS configuration information regarding the horizontal antenna port as listed in a following table 2 and individual CSI-RS configuration information regarding the vertical antenna port as listed in a following table 3.

TABLE 2

| | Information field |
|---|---|
| Individual CSI-RS configuration information regarding the horizontal antenna port | Antenna port count (antennaPortsCount): the number of antenna ports for transmitting the CSI-RS Resource configuration (ResourceConfig): CSI-RS pattern Sub-frame configuration (SubframeConfig): indicates a sub-frame transmitting CSI-RS Antenna port index (antennaPortIndex): indicates a number of a horizontal antenna port mapped to a cross point antenna |

TABLE 3

| | Information field |
|---|---|
| Individual CSI-RS configuration information regarding the vertical antenna port | Antenna port count (antennaPortsCount): the number of antenna ports for transmitting the CSI-RS Resource configuration (ResourceConfig): CSI-RS pattern Sub-frame configuration (SubframeConfig): indicates a sub-frame transmitting CSI-RS Antenna port index (antennaPortIndex): indicates a number of a vertical antenna port mapped to a cross point antenna |

Referring to the table 2 and the table 3, the individual CSI-RS configuration information includes the antenna port count antennaPortsCount information field, a resource configuration ResourceConfig) information field, sub-frame configuration subframeConfig information field, and an antenna port index antebbaPortIndex information field. The antenna port count information field indicates the number of antenna ports for transmitting the CSI-RS. The resource configuration information field indicates the CSI-RS pattern. The CSI-RS pattern may have total 32 types based on supported maximum representative antennas of each direction. In order to express 32 CSI-RS patterns, the resource configuration information field is 5 bit information. The sub-frame configuration information field indicates a sub-frame transmitting the CSI-RS.

The antenna port index indicates a number of the antenna port mapped to the cross point antenna. The cross point antenna 520 is located at a cross point of the horizontal representative antennas 500 and the vertical representative antennas 510. That is, one horizontal antenna port and one vertical antenna port are mapped to one cross point antenna 520. That is, two antenna ports for transmitting the CSI-RS are mapped to the one cross point antenna 520.

The antenna port index information field included in the individual CSI-RS configuration information regarding the horizontal antenna port indicates the horizontal antenna port mapped to the cross point antenna. In contrast, the antenna port index information field included in the individual CSI-RS configuration information regarding the vertical antenna port indicates the vertical antenna port mapped to the cross point antenna. The channel estimation performance in the cross point antenna 520 is more exact and precision of reference signal received power (RSRP) measurement may be improved.

Next, for example, the common CSI-RS configuration is defined as listed in a following table 4.

TABLE 4

| | Information field |
|---|---|
| Common CSI-RS configuration information | $N_{ID}^{CSI}$: virtual cell ID for initial CSI-RS scrambling state |
| | $P_C$: ratio of CSI-RS EPRE estimated by UE to PDSCH EPRE |

Referring to the table 4, the common CSI-RS configuration information includes an NCSIID information field and a Pc information field. The NCSIID information field indicates a virtual cell ID for initial CSI-RS scrambling state. Moreover, the Pc information field is an assumed ratio of PDSCH energy per resource element (EPRE) to energy per CSI-RS resource element (EPRE) when the UE induces CSI feedback. A value of Pc has a range of [−8, 15] dB, and is increased/reduced at 1 dB size interval.

The above embodiment has described a concept for selecting a representative antenna in order to reduce transmission overhead of the CSI-RS. However, to reduce the transmission amount of the CSI-RS may not be suitable in a very bad environment in a channel state. Accordingly, another embodiment of the present invention presupposes a scenario where all antennas may transmit the CSI-RS in an antenna system on a two-dimensional plane. For example, when 64 antennas transmit the CSI-RS, there is a need for maximum 64 antenna ports or maximum 64 CSI-RS patterns. Accordingly, the bit number consumed in information on the number of antenna ports as well as information on a CSI-RS pattern is increased. That is, the size of the CSI-RS configuration information is inevitably increased.

Therefore, another embodiment of the present invention discloses a method of compactly generating or configuring information on antenna port for CSI-RS transmission and information on a CSI-RS pattern.

To this end, a CSI-RS correspondence bitmap is defined. A length of the CSI-RS correspondence bitmap is n bits. In this case, the n represents the number of supportable CSI-RS patterns.

Figure 6:
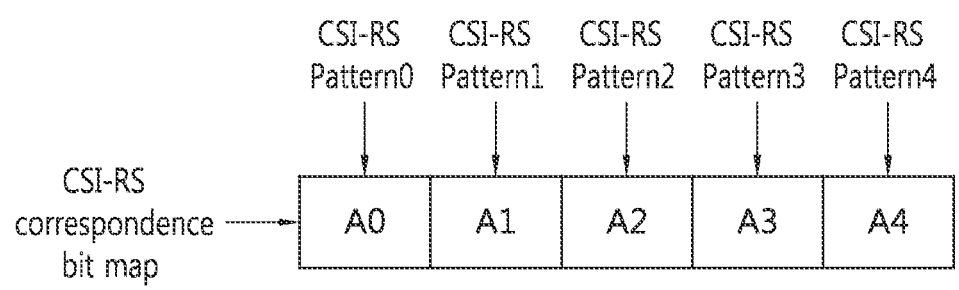
FIG. 6 is a block diagram illustrating a CSI-RS correspondence bit map according to an example of the present invention.

FIG. 6 is a block diagram illustrating a CSI-RS correspondence bit map according to an example of the present invention when n=5.

Referring to FIG. 6, each bit of the CSI-RS correspondence bit map corresponds to one of five types of CSI-RS patterns according to a position thereof. For example, a most significant bit (MSB) A0 corresponds to a CSI-RS pattern 0. An A1 corresponds to a CSI-RS pattern 1. An A2 corresponds to a CSI-RS pattern 2. An A3 corresponds to a CSI-RS pattern 3. A least significant bit (LSB) A4 corresponds to a CSI-RS pattern 4. A scheme where each bit corresponds to a CSI-RS pattern is applicable to various embodiments. That is, diversity of the CSI-RS pattern is limited to five. For example, five CSI-RS pattern is as follows.

TABLE 5

| CSI-RS pattern | The number of configured CSI-RSs ||||||
|---|---|---|---|---|---|---|
| | 1 or 2 || 4 || 8 ||
| | (k', l') | $n_S$ mod 2 | (k', l') | $n_S$ mod 2 | (k', l') | $n_S$ mod 2 |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (2, 2) | 1 | (2, 2) | 1 | (7, 2) | 1 |
| 4 | (9, 5) | 1 | (9, 5) | 1 | (9, 5) | 1 |

Referring to the table 5, k' and l' are parameters used to calculated k and l, respectively, and is determined as listed in the table 2 according to a CSI-RS pattern. For example, when the number of configured CSI-RSs is 2 and a CSI-RS pattern is 0, k'=9 and l'=5. This means that a CSI-RS pattern to which a first resource element is mapped is used in k=9 and l=5 among a plurality of CSI-RS patterns which is previously set to transmit two CSI-RSs. For example, when 8 CSI-RS antenna ports are used, the CSI-RS pattern 0 is illustrated in FIG. 2. The $n_s$ is a slot number and is 0 or 1. This is for the purpose only. A CSI-RS pattern may be expressed to have a form different from that of FIG. 2 according to the number of CSI-RS antenna ports and a CSI-RS pattern number.

As described above, different CSI-RS patterns are defined according to the number of used CSI-RS antenna ports. In the present invention, when the CSI-RS correspondence bit map is transmitted, the UE detects information whether the bit map is a bit map for a CSI-RS pattern set to use several CSI-RS port. In the CSI-RS correspondence bit map, 0 or 1 of each bit indicates a meaning as follows. For example, a specific CSI-RS pattern among CSI-RS patterns made to use a specific number of CSI-RS antenna ports is selected or used, a corresponding bit indicates 1. If the specific CSI-RS pattern is not selected or used, a corresponding bit indicates 0.

Figure 7:
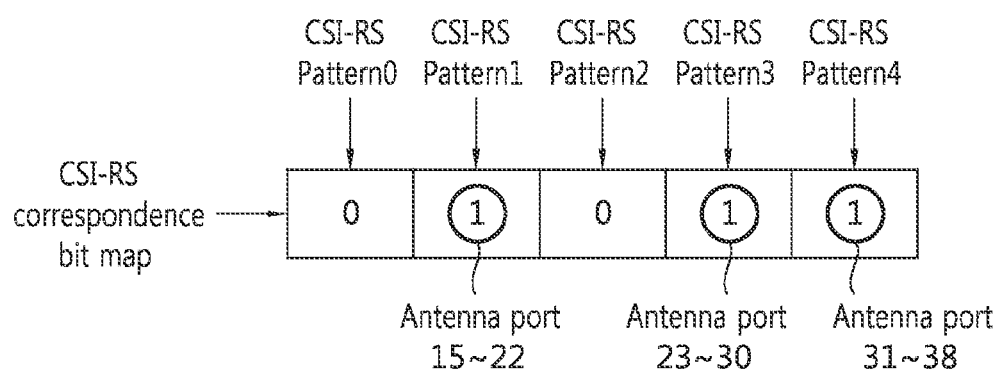
FIG. 7 is a block diagram illustrating a CSI-RS correspondence bit map according to another example of the present invention.

As an embodiment, when a bit corresponding to a specific CSI-RS pattern is 1, the base station may transmit a CSI-RS according to the specific CSI-RS pattern in q defined antenna ports. That is, each bit indicates the CSI-RS pattern in q antenna port units. In other words, if the CSI-RS pattern is selected, the number of CSI-RSs transmitted according to a corresponding CSI-RS pattern is fixed to q. For example, q=8 may be previously regulated between the UE and the base station. If the CSI-RS correspondence bit map is given as 01011 as illustrated in FIG. 7, since the MSB A0=0, a CSI-RS pattern 0 among CSI-RS patterns designed to transmit 8 CSI-RS antenna ports is not used. Since a next A1=1, the CSI-RS pattern 1 is used. In this case, antenna ports 15~22 transmit the CSI-RS according to the CSI-RS pattern 1. This is because an antenna port for transmitting the CSI-RS starts a number from 15.

Next, since A2=0, a CSI-RS pattern 2 is not used. Next, since A3=1, a CSI-RS pattern 3 is used. In this case, antenna ports 23~30 transmit the CSI-RS according to the CSI-RS pattern 3. Since antenna ports 1~22 use a previous CSI-RS pattern 1, total 8 antenna ports of antenna ports 23 to 30 transmit the CSI-RS. Finally, since the LSB A4=1, the CSI-RS pattern 4 is used. In this case, antenna ports 31~38 transmit the CSI-RS according to the CSI-RS pattern 4. As described above, indexes of the antennas are determined depending on a position of a bit in the CSI-RS correspondence bit map. Since the number of antenna ports for transmitting the CSI-RS is a multiple of 8, that is, 8, 16, 24, . . . , an antenna port number is automatically determined according to an order of a bit in a CSI-RS correspondence bit map. That is, there is no need for signaling to concretely and explicitly indicate the antenna port number using the CSI-RS pattern.

Meanwhile, since five CSI-RS patterns and 8 antenna ports by CSI-RS patterns are supported, when the CSI-RS correspondence bit map is 11111, the CSI-RS may be transmitted through maximum 5×8=40 antenna ports.

As described, if antenna ports used to be transmitted by CSI-RS patterns are previously defined as a predetermined number, there is no need for signaling reporting the number of antenna ports according to each pattern, and the CSI-RS configuration information may be reduced to a compact form as listed in a following table 6.

TABLE 6

| | Information field |
|---|---|
| CSI-RS configuration information | CSI-RS correspondence bit map: is 5 bits where each bit corresponds to the CSI-RS pattern. If a bit value is 1, it indicates that a corresponding CSI-RS pattern is used. If the bit value is 0, it indicated that a corresponding CSI-RS pattern is not used.<br>Sub-frame configuration (subframeConfig): indicates a sub-frame transmitting the CSI-RS<br>$N_{ID}^{CSI}$: virtual cell ID for initial scrambling state<br>$P_C$: ratio of CSI-RS EPRE estimated by UE to PDSCH EPRE |

Referring to the table 6, the CSI-RS configuration information includes a CSI-RS correspondence bit map, a sub-frame configuration information field, an NCSIID information field, and a Pc information field. Contents of each information field are illustrated above.

Hereinafter, as described above, a method of estimating a channel using the CSI-RS by UE in a multiple antenna system and feedbacking a PMI is disclosed. This causes influence upon channel estimation and PMI feedback due to a double CSI-RS.

According to an embodiment, the terminal performs channel estimation based on a double CSI-RS. Further, the UE may feedback a double PMI corresponding to the double CSI-RS to the base station based on the channel estimation. One PMI corresponds to a CSI-RS of a horizontal antenna port. Another PMI corresponds to a CSI-RS of a vertical antenna port. Beamforming of a two-dimensional plane may be supported with respect to all directions by a double PMI.

A codebook is designed with respect to 2, 4, and 8 transmission antennas. The present embodiment designs a codebook as a double PMI with respect to an antenna arrangement shown in FIG. 5 with respect to 8 transmission antennas.

Figure 8:
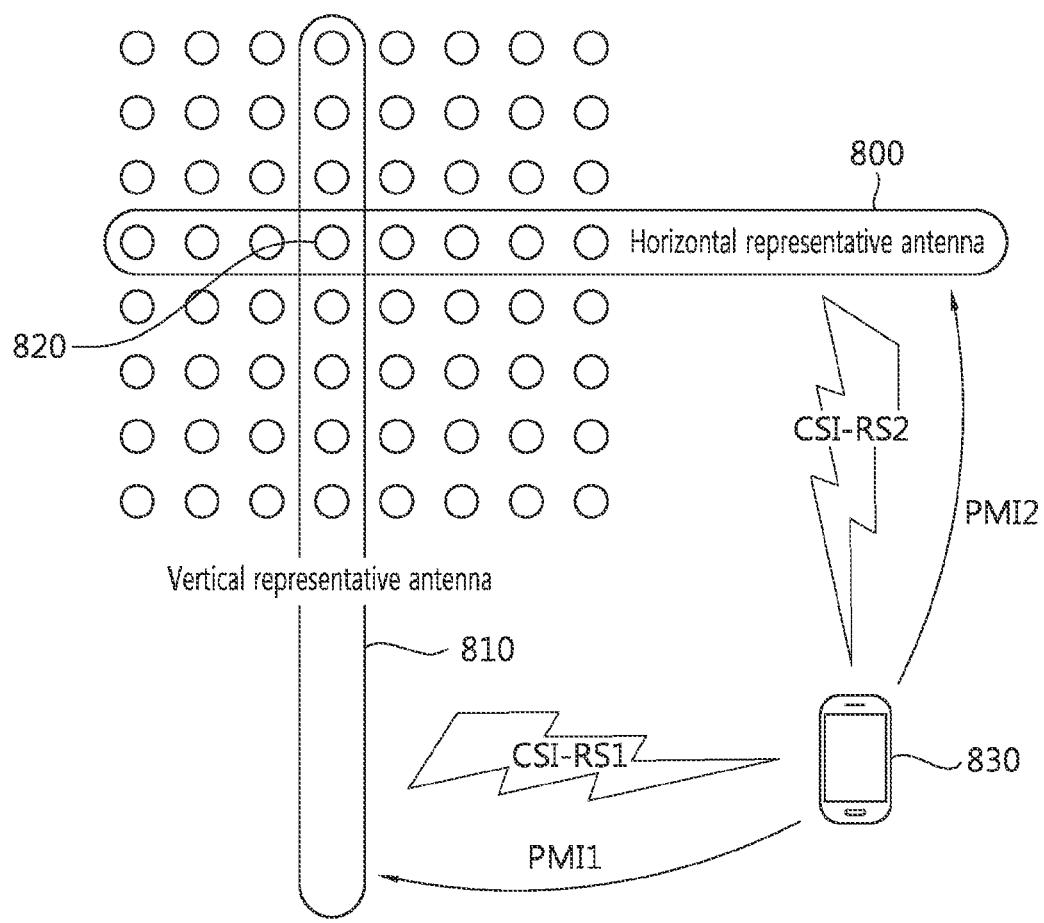
FIG. 8 is a diagram illustrating a double PMI feedback process according to an example of the present invention.

FIG. 8 is a diagram illustrating a double PMI feedback process according to an example of the present invention.

Referring to FIG. 8, an 8×8 antenna is supported by a multiple antenna system. Eight horizontal representative antennas 800 are located in an x axis direction, and eight vertical representative antennas 810 are located in a y axis direction. Maximum 8 horizontal antenna ports may be mapped to the horizontal representative antennas 800. Maximum 8 horizontal antenna ports may be mapped to the vertical representative antennas 810. The horizontal antenna port transmits a CSI-RS1 to the UE 830, and the vertical antenna port transmits a CSI-RS2 to the UE 830. That is, the double CSI-RS is transmitted to the UE 830.

Meanwhile, the UE 830 feedbacks a double PMI corresponding to the double CSI-RS to the base station. A PMI1 corresponds to the CSI-RS2 and a PMI2 corresponds to a CSI-RS2. The PMI1 is for the purpose of horizontal beamforming, and the PMI2 is for the purpose of vertical beamforming. The number of antenna ports for transmitting the CSI-RS supported from each direction corresponds to one of 2, 4, and 8, regardless of a horizontal direction or the vertical direction.

A codebook with respect to two and four antenna ports is designed based on an independent spatial channel. Meanwhile, a codebook with respect to 8 antenna ports is designed based on an x-polarized antenna arrangement. If all x-polarized antennas are not used with respect to all antennas, an optimized codebook is redesigned. There is no need for a co-phasing part. Based on the original codebook, the present embodiment may design the codebook by a combination of discrete Fourier transform (DFT) beam and beam selection.

For example, DFT beam for 8 transmission antennas is designed. A vector $v_m$ may be designed as expressed in a following equation by removing copaging (or phase adaptation) part while maintaining a beam selection part.

$$v_m = [1\ e^{j4\pi m/64}\ e^{j8\pi m/64}\ e^{j12\pi m/64}\ e^{j16\pi m/64}\ e^{j20\pi m/64}\ e^{j24\pi m/64}\ e^{j28\pi m/64}]^T \quad \text{[Equation 2]}$$

Referring to the equation 2, a vector $v_m$ having a size of 8 is designed in the form where a phase is sequentially changed to $e^{j28\pi m/64}$ of a first element to eighth element. Since beamforming of 8 layers is performed in unit of 4 layers twice and phase adaption is not applied, the size of the vector is 8, and a fifth element is not 1 but is $e^{j16\pi m/64}$. Since precoding is applied to the 8 layers at one time, the resolution is increased.

Further, a codebook may be defined by the number of layers for CSI report using 8 antenna ports (numbers 15~22) as follows.

$$W_m^{(1)} = \frac{1}{\sqrt{8}} v_m \quad \text{[Equation 3]}$$

$(m = 0 \sim 15)$ $$W_m^{(2)} = \frac{1}{4}[v_m\ v_{m+8}] \quad \text{[Equation 4]}$$

$(m = 0 \sim 7)$ $$W_m^{(3)} = \frac{1}{\sqrt{24}}[v_m\ v_{m+4}\ v_{m+8}] \quad \text{[Equation 5]}$$

$(m = 0 \sim 7)$ $$W_m^{(4)} = \frac{1}{\sqrt{32}}[v_m\ v_{m+4}\ v_{m+8}\ v_{m+12}] \quad \text{[Equation 6]}$$

$(m = 0 \sim 3)$ $$W_m^{(5)} = \frac{1}{\sqrt{40}}[v_m\ v_{m+4}\ v_{m+6}\ v_{m+8}\ v_{m+12}] \quad \text{[Equation 7]}$$

$$W_m^{(6)} = \frac{1}{\sqrt{48}}[v_m\ v_{m+4}\ v_{m+8}\ v_{m+12}\ v_{m+14}] \quad \text{[Equation 8]}$$

$$W_m^{(7)} = \frac{1}{\sqrt{56}}[v_m\ v_{m+4}\ v_{m+8}\ v_{m+10}\ v_{m+12}\ v_{m+14}] \quad \text{[Equation 9]}$$

$(m = 0 \sim 1)$ $$W_m^{(8)} = \frac{1}{8}[v_m\ v_{m+2}\ v_{m+4}\ v_{m+6}\ v_{m+8}\ v_{m+10}\ v_{m+12}\ v_{m+14}] \quad \text{[Equation 10]}$$

$(m = 0 \sim 1)$

The equations 3 to 10 sequentially illustrate a codebook with respect to 1, 2, 3, 4, 5, 6, 7, and 8 layers.

The m represents the number of layers. The UE acquires a channel $H^H$ with respect to beamforming in a horizontal direction and a channel $H^V$ with respect to beamforming in a vertical direction by performing channel estimation. Further, the UE selects an optimal codebook with respect to each channel using the equation 3 to the equation 10. For example, the UE multiplies a channel $H^H$ as expressed in the equation 11 to by a codebook according to each layer as expressed in the equations 3 to 10, and may select the maximum codebook among them as a codebook 1 with respect to beamforming in a horizontal direction.

$$\max[|H^H W_m|] \quad \text{[Equation 11]}$$

Further, the UE multiplies a channel $H^V$ as expressed in the equation 12 to by a codebook according to each layer as expressed in the equations 3 to 10, and may select the maximum codebook among them as a codebook 2 with respect to beamforming in a vertical direction.

$$\max[|H^V W_m|] \quad \text{[Equation 12]}$$

Moreover, the UE may transmit a PMI1 indicating a codebook 1 and a PMI2 indicating a codebook 2 as a double PMI to the base station. If the base station receives feedback of the double PMI from the UE, the base station determines to perform precoding based on any PMI from the double PMI. Following two methods may be used as the method therefor.

(1) Kronecker Product

When two ranks of C2 (PMI2) with respect to a precoding matrix C1(PMI1) are R1 and R2, a final rank R is expressed as R1×R2. If the final precoding matrix is obtained as the kronecker product, the final precoding matrix is C=kron(C1, C2). Since the resolution with respect to beamforming in a vertical direction is low, it is difficult to support a high rank. That is, it is preferable that beamforming in the vertical direction is supported to only MU-MIMO. Accordingly, a rank according to the present embodiment is set as 1 associated with feedback in the vertical direction. There is no feedback of a rank indicator (RI) regarding the beamforming in the vertical direction.

Accordingly, the PMI feedback is performed by following conditions. i) Beamforming in the horizontal direction is feedback with respect to 8 transmission antennas, and a rank uses 1~8. ii) Beamforming in the vertical direction does not feedback a rank indicator, and only a rank 1 is used.

(2) Scheme where a double PMI shares the same rank R

When the final precoding matric is C, this may be made in a vector level. That is, the kronecker product is performed in the vector level. Each vector $b_i$ of the final precoding matrix uses a following equation 13.

$$b_i = b_i^{(1)} \otimes b_i^{(2)} \qquad \text{[Equation 13]}$$

Meanwhile, the UE may not use a codebook. This refers to non-codebook based feedback. That is, the codebook expressed by the equations 3 to 10 is not used. Associated with the non-codebook based feedback, the present embodiment discloses joint aperiodic/periodic feedback. The aperiodic feedback indicates that the UE exactly calculates a desired direction of beam as a horizontal component and a vertical component to report the calculated desired direction of the beam to the base station. The periodic feedback indicates that the UE reports change in a determined direction of beam to the base station as a differential value. The rank is reported in the aperiodic feedback.

For example, the aperiodic feedback include following information fields.

TABLE 7

| Information field | Bit number |
| --- | --- |
| Rank indicator (RI) | 3 |
| Horizontal direction of a first beam | 6 |
| Horizontal direction of a second beam | 6 |
| ... | ... |
| Horizontal direction of a RI-th beam | 6 |
| Vertical direction of the beam | 6 |
| CQI | 4/8 |

Referring to the table 7, since the number of supportable ranks is maximum 8, the rank indicator may be displayed as 3 bits information. If 8×8 transmission antennas are assumed, 8 horizontal antennas may control a direction with one beam. For example, in FIG. 8, 8 upper most horizontal antennas have directionality of 360° in a horizontal direction as the first beam. In this case, as illustrated in the table 7, the 360° may be divided into 6 bits, that is, 2⁶=64 angles. Accordingly, an angel of the beam may support resolution of about 5.625°. Next, similarly, second 8 horizontal upper most antennas of FIG. 8 have directionality of 360° in the horizontal direction as the second beam. Further, as listed in the table 7, in order to display a direction of the second beam in the horizontal direction, 6 bits are assigned. In this way, the aperiodic feedback displays a horizontal direction of the beam by the total rank number. In addition, since the vertical direction of the beam is commonly applied to all horizontal antennas, only one information field is present. Moreover, as listed in the table 7, since the information bit is 6 bits, resolution of about 5.625° is displayed. The number of bits displaying a direction of each beam may be 6 bits or greater or less.

Further, in contrast, as listed in a following table 8, the vertical direction of the beam is defined by the rank number, and one horizontal direction of the beam may be defined.

TABLE 8

| Information field | Bit number |
| --- | --- |
| Rank indicator (RI) | 3 |
| Vertical direction of a first beam | 6 |
| Vertical direction of a second beam | 6 |
| ... | ... |
| Vertical direction of an RI-th beam | 6 |
| Horizontal direction of a beam | 6 |
| CQI | 4/8 |

Next, the periodic feedback is a differential value. For example, a differential value with respect to vertical change in the beam direction includes a following information field.

TABLE 9

| Code point | Differential value |
| --- | --- |
| 0 | π/64 increase |
| 1 | π/64 reduction |

Referring to the table 9, the periodic feedback is 1 bit and indicates code points 0 and 1. If the information field of the periodic feedback is 0, the periodic feedback indicates to vertically increase a beam direction by π/64. If the information field of the periodic feedback is 1, the periodic feedback indicates to vertically reduce a beam direction by π/64.

As another example, the maximum bit number of the periodic feedback may be 9. The horizontal change in the beam direction may be faster than the vertical change in the beam direction. If a differential value with respect to the horizontal change in the beam direction is the same as a differential value with respect to the vertical change in the beam direction, the change may not be recognized. As a method for solve this, two embodiments will be described.

A first embodiment indicates a differential value with respect to the horizontal change in the beam direction as the information field as listed in the table 10, and includes to report the periodic feedback to the base station.

TABLE 10

| Code points | Differential values |
| --- | --- |
| 0 | π/32 increase |
| 1 | π/32 reduction |

The second embodiment includes wherein the UE uses feedback of another bit with respect to another link. In this case, the maximum number of bits for the periodic feedback is 9 bits. In this case, the maximum 8 bits indicate a differential value with respect to the horizontal change in the beam direction and a remaining one bit indicates a differential value with respect to the vertical change in the beam direction.

For example, if the rank is greater than 4, one bit with respect to each layer is used to indicate a differential value with respect to the horizontal change in the beam direction. If the rank is 3 or 4, two bits with respect to each layer are used to indicate a differential value with respect to the horizontal change in the beam direction. If the rank is 1 or 2, four bits with respect to each layer are used to indicate a differential value with respect to the horizontal change in the beam direction. This is expressed by a following table 11.

TABLE 11

| Ranks | The bit number consumed to feedback the differential value |
|---|---|
| 1~2 | 4 bits, differential value range (-7~8) |
| 3~4 | 2 bits, differential value range (-1, 0, 1, 2) |
| 5~8 | 1 bit, differential value range (-1, 1) |

The UE may use the horizontal change in the beam direction using this.

2. DMRS

Another embodiment according to the present invention may design a DMRS to support a plurality of layers. According to the related art, at least eight layers are supported for single user MIMO of one UE for transmitting the DMRS. At least four layers are support for a multiple user MIMO. Meanwhile, in the wireless communication system for supporting at least 64 physical antennas, maximum 8 layers are supported for the multiple user MIMO. Accordingly, the present embodiment discloses a method of transmitting a DMRS in the wireless communication system for supporting maximum 8 layers for the multiple user MIMO.

As supported layers are increased, the number of the DMRSs is increased. Accordingly, there is a need for a method to identify the DMRSs. Orthogonality should be satisfied between different DMRSs or DMRSs of different UEs. A sequence is used to transmit the DMRS.

The reference signal is generally transmitted to a sequence. An optional sequence may be used as the reference signal sequence without special limitation. The reference signal sequence may use a PSK-based computer generated sequence generated through a Phase Shift Keying (PSK) based computer. For example, the PSK includes Binary Phase Shift Keying (BPSK) and Quadrature Phase Shift Keying (QPSK). Alternatively, the reference signal sequence may use a Constant Amplitude Zero Auto-Correlation (CAZAC) sequence. For example, the CAZAC includes a Zadoff-Chu (ZC)-based sequence, a ZC sequence with cyclic extension, and a ZC sequence with truncation. Alternatively, the reference signal sequence may use a pseudo-random (PN) sequence. For example, the PN sequence includes an m-sequence, a sequence generated through a computer, a gold sequence, and a Kasami sequence. Further, the reference signal sequence may use a cyclically shifted sequence.

Parameters used to generate the DMRS sequence include antenna port number and a scrambling identity $n_{CSID}$. In addition, the present embodiment further includes the number information of resource elements. Such parameters may refer to information used to give orthogonality of the DRX.

The parameters used to generate the DMRS sequence are included to be transmitted. For example, information fields included in the DCI are illustrated in a following table 12.

TABLE 12

- Carrier indicator : 0 or 3 bits- HARQ process number: 3 bits (FDD), 4 bits(TDD)- transmission power control (TPC) command for PUCCH: 2 bits-downlink assignment index : 2 bits- each transmission block - modulation and coding scheme: 5 bits - new data indicator: 1 bit - redundancy version:
2 bits- resource block assignment - local resource assignment :
 $\lceil \log_2(N_{RB}^{DL}(N_{RB}^{DL}+1)2 \rceil$ bit - distribution resource assignment :
 $\lceil \log_2(N_{RB}^{DL}(N_{RB}^{DL}+1)/2 \rceil$ or
 $\lceil \log_2(N_{RB}^{DL}(N_{RB}^{DL}+1)/2-1 \rceil$ bit - sequence generation value: 4 bits- downlink assignment index (DAI)

Referring to the table 12, the DCI may include a carrier indicator field, an HARQ process number field, a transmission power control command field, a resource field assignment field, a downlink assignment index field, and particularly includes a sequence generation value field of 4 bits.

The information fields included in the table 12 are illustrative purpose only, and a technical scope of the present invention includes a new information field together with the information fields as well as a DCI from which at least one information field is omitted. In the table 12, the sequence generation value indicates an antenna port number, a scrambling identifier, the number of layers, and the number of resource elements. For example, the sequence generation value is 4 bits. The number of resource elements indicates the number of resource elements used to transmit the DMRS. Since the sequence generation value is 4 bits, the sequence generation value indicates total 16 cases.

The maximum number of layers for the DMRS with respect to the DMRS is 8, but maximum 8 UEs with respect to multiple users MIMOs may be supported. Associated with the maximum number of layers per UE in a multiple user MIMO mode, the present embodiment includes both a case where the base station and the UE support maximum two layers and a case where the base station and the UE support maximum four layers.

First, for example, a case where maximum two layers per UE in the multiple user MIMO mode is described. In this case, for example, the indication may be defined as listed in a following table 13.

TABLE 13

| Single codeword | | Two codewords | |
|---|---|---|---|
| Sequence generation value | Indication contents | Sequence generation value | Indication contents |
| 0 | 1 layer, port 7, $n_{SCID}$ = 0, 12 RE | 0 | 2 layer, port 7-8, $n_{SCID}$ = 0, 12 RE |
| 1 | 1 layer, port 7, $n_{SCID}$ = 1, 12 RE | 1 | 2 layer, port 7-8, $n_{SCID}$ = 1, 12 RE |
| 2 | 1 layer, port 8, $n_{SCID}$ = 0, 12 RE | 2 | 2 layer, port 7-8, $n_{SCID}$ = 0, 24 RE |
| 3 | 1 layer, port 8, $n_{SCID}$ = 1, 12 RE | 3 | 2 layer, port 7-8, $n_{SCID}$ = 1, 24 RE |
| 4 | 1 layer, port 7, $n_{SCID}$ = 0, 24 RE | 4 | 2 layer, port 9-10, $n_{SCID}$ = 0, 24 RE |
| 5 | 1 layer, port 7, $n_{SCID}$ = 1, 24 RE | 5 | 2 layer, port 9-10, $n_{SCID}$ = 1, 24 RE |
| 6 | 1 layer, port 8, $n_{SCID}$ = 0, 24 RE | 6 | 2 layer, port 11-12, $n_{SCID}$ = 0, |
| | | 7 | 2 layer, port 13-14, $n_{SCID}$ = 0, |
| 7 | 1 layer, port 8, $n_{SCID}$ = 1, 24 RE | 8 | 2 layer, port 11-12, $n_{SCID}$ = 1, |
| | | 9 | 2 layer, port 13-14, $n_{SCID}$ = 1, |
| 8 | 1 layer, port 9, $n_{SCID}$ = 0 | 10 | 3 layer, port 7-9 |
| | | 11 | 4 layer, port 7-10 |
| 9 | 1 layer, port 9, $n_{SCID}$ = 1 | 12 | 5 layer, port 7-11 |
| | | 13 | 6 layer, port 7-12 |
| 10 | 1 layer, port 10, $n_{SCID}$ = 0 | 14 | 7 layer, port 7-13 |
| | | 15 | 8 layer, port 7-14 |
| 11 | 1 layer, port 10, $n_{SCID}$ = 1 | | |
| 12 | 2 layer, port 7-8, $n_{SCID}$ = 0 | | |
| 13 | 2 layer, port 7-8, $n_{SCID}$ = 1 | | |
| 14 | 3 layer, port 7-9 | | |
| 15 | 4 layer, port 7-10 | | |

Referring to the table 13, the antenna port number, the number of layers, the scrambling identifier, and the number of resource elements are used to generate the DMRS sequence. The sequence generation values 0~7 include the same two combinations of the number of layers, the antenna port number, and the scrambling identifier. For example, the sequence generation value 0 and the sequence generation value 4 have the same number of layers, the same antenna port number, and the same scrambling identifier. Accordingly, in order to identify them, the number of resource elements is used. Meanwhile, since there is no case where the sequence generation values 8~15 have the same number of layers, the same antenna port number, and the same scrambling identifier, the number of resource elements is not used.

Further, if the sequence generation value is 0 while transmitting two codewords, this indicates that a DMRS associated with transmission of the two codewords is transmitted using two layers, seventh and eighth antenna ports, $n_{SCID}$=0, and 12 resource elements. Meanwhile, Further, if the sequence generation value is 2 while transmitting two codewords, this indicates that a DMRS associated with transmission of the two codewords is transmitted using two layers, seventh and eighth antenna ports, $n_{SCID}$=0, and 24 resource elements. That is, when the sequence generation value is 0 and 2, there is a difference between the number of resource elements to which the DMRS is mapped and parameters are the same as each other.

It is assumed that a multiple user MIMO is supported to UE1 and UE2 based on a 1 codeword. If the sequence generation value with respect to the UE1 is 0 and a sequence generation value with respect to the UE2 is 4, since the antenna port number between the UE 1 and the UE 2 is the same as each other as 7 or 8, the $n_{SCID}$ between the UE1 and the UE2 is the same, the number of resource elements in the UE1 and the number of resource elements in the UE2 are 12 and 24, respectively, orthogonality between DMRSs of the UE1 and the UE2 may be ensured.

Accordingly, when two UEs operate in a multiple user MIMO mode and a DMRS is to the two UEs by only one layer, the base station sets a sequence generation value so that the number of resource elements is changed according to the two UEs in order to ensure orthogonality of the DMRS with respect to the two UEs. Accordingly, although a transmission amount of the DMRS is increased in the multiple user MIMO operation, orthogonality between DMRSs may maintain. Since there is no ambiguity of mapping for the DMRS, the UE may identify each DMRS.

Next, a case of supporting the maximum 4 layers per UE in a multiple user MIMO mode is described by way of example. In this case, for example, the sequence generation value may be defined as listed in a following table 14.

TABLE 14

| Single codeword | | Two codewords | |
|---|---|---|---|
| Sequence generation value | Indication contents | Sequence generation value | Indication contents |
| 0 | 1 layer, port 7, $n_{SCID}$ = 0, 12 RE | 0 | 2 layer, port 7-8, $n_{SCID}$ = 0, 12 RE |
| 1 | 1 layer, port 7, $n_{SCID}$ = 1, 12 RE | 1 | 2 layer, port 7-8, $n_{SCID}$ = 1, 12 RE |
| 2 | 1 layer, port 8, $n_{SCID}$ = 0, 12 RE | 2 | 2 layer, port 7-8, $n_{SCID}$ = 0, 24 RE |
| 3 | 1 layer, port 8, $n_{SCID}$ = 1, 12 RE | 3 | 2 layer, port 7-8, $n_{SCID}$ = 1, 24 RE |

TABLE 14-continued

| Single codeword | | Two codewords | |
|---|---|---|---|
| Sequence generation value | Indication contents | Sequence generation value | Indication contents |
| 4 | 1 layer, port 7, $n_{SCID}$ = 0, 24 RE | 4 | 2 layer, port 9-10, $n_{SCID}$ = 0, 24 RE |
| 5 | 1 layer, port 7, $n_{SCID}$ = 1, 24 RE | 5 | 2 layer, port 9-10, $n_{SCID}$ = 1, 24 RE |
| 6 | 1 layer, port 8, $n_{SCID}$ = 0, 24 RE | 6 | 3 layer, port 11-12, $n_{SCID}$ = 0, |
| 7 | 1 layer, port 8, $n_{SCID}$ = 1, 24 RE | 7 | 3 layer, port 13-14, $n_{SCID}$ = 0, |
| 8 | 1 layer, port 9, $n_{SCID}$ = 0 | 8 | 3 layer, port 7-9, $n_{SCID}$ = 0, |
| 9 | 1 layer, port 9, $n_{SCID}$ = 1 | 9 | 3 layer, port 7-9, $n_{SCID}$ = 1, |
| 10 | 1 layer, port 10, $n_{SCID}$ = 0 | 10 | 4 layer, port 7-10, $n_{SCID}$ = 0, |
| 11 | 1 layer, port 10, $n_{SCID}$ = 1 | 11 | 4 layer, port 7-10, $n_{SCID}$ = 1, |
| 12 | 2 layer, port 7-8, $n_{SCID}$ = 0 | 12 | 5 layer, port 7-11 |
| 13 | 2 layer, port 7-8, $n_{SCID}$ = 1 | 13 | 6 layer, port 7-12 |
| 14 | 3 layer, port 7-9 | 14 | 7 layer, port 7-13 |
| 15 | 4 layer, port 7-10 | 15 | 8 layer, port 7-14 |

Referring to the table 14, port number for sequence generation values 8~11 in two codewords are different from that in the table 13.

As another example, information fields included in the DCI are illustrated in a following table 15.

TABLE 15

- Carrier indicator : 0 or 3 bits- HARQ process number: 3 bits (FDD),
4 bits (TDD)- transmission power control (TPC) command for
PUCCH : 2 bits-downlink assignment index: 2 bits- every transmission
block - modulation and coding scheme : 5 bits - new data indicator:
1 bit - redundancy version :
2 bits - resource block assignment - local resource assignment:
$\lceil \log_2(N_{RB}^{DL}(N_{RB}^{DL}+1)/2 \rceil$ bit  - distribution resource
assignment:
$\lceil \log_2(N_{RB}^{DL} (N_{RB}^{DL}+1)/2 \rceil$ or
$\lceil \log_2(N_{RB}^{DL} (N_{RB}^{DL}+1/2-1 \rceil$ bit- sequence generation value: 4
or 5 bits- downlink assignment index (DAI)

The table 15 is different from the table 14 in that the sequence generation value field is 4 or 5. Remaining fields are the same. Further, the sequence generation value of 4 bits is different from the table 14 in that the sequence generation value field indicates a combination of the antenna port number, the number of layers, and the number of resource elements. Meanwhile, the sequence generation value field of 5 bits indicates a combination of the antenna port number, the scrambling identifier, the number of layers, and the number of resource elements.

According to the sequence generation value as listed in the table 15, orthogonality between different DMRSs or DMRSs of different UEs may be increased. The number of cases where a DMRS of the multiple user MIMO may be increased. The maximum number of layers with respect to a single user MIMO is 8. In practice, since interpolation in channel estimation is not considered, the number of resource elements may be determined as 12 or 24. Further, use of a certain pattern (that is, the number of resource elements) is indicated as listed in a following table 16 according to the sequence generation value of 4 bits.

TABLE 16

| Single codeword | | Two codewords | |
| --- | --- | --- | --- |
| Sequence generation value | Indication contents | Sequence generation value | Indication contents |
| 0 | 1 layer, port 7, 12 REs | 0 | 2 layer, port 7-8, 12 REs |
| 1 | 1 layer, port 7, 24 REs | 1 | 2 layer, port 7-8, 24 REs |
| 2 | 1 layer, port 8, 12 REs | 2 | 2 layer, port 9-10, 24 REs |
| 3 | 1 layer, port 8, 24 REs | 3 | 2 layer, port 11-12, 24 REs |
| 4 | 1 layer, port 9, 24 REs | 4 | 2 layer, port 13-14, 24 REs |
| 5 | 1 layer, port 10, 24 REs | 5 | 3 layer, port 7-9, 24 REs |
| 6 | 1 layer, port 11, 24 REs | 6 | 3 layer, port 10-12, 24 REs |
| 7 | 1 layer, port 12, 24 REs | 7 | 4 layer, port 7-10, 24 REs |
| 8 | 1 layer, port 13, 24 REs | 8 | 4 layer, port 11-14, 24 REs |
| 9 | 1 layer, port 14, 24 REs | 9 | 5 layer, port 7-11, 24 REs |
| 10 | 2 layer, port 7-8, 12 REs | 10 | 6 layer, port 7-12, 24 REs |
| 11 | 2 layer, port 7-8, 24 REs | 11 | 7 layer, port 7-13, 24 REs |
| 12 | 2 layer, port 9-10, 24 REs | 12 | 8 layer, port 7-14, 24 REs |
| 13 | 2 layer, port 11-12, 24 REs | 13 | Reserved |
| 14 | 3 layer, port 7-9, 24 REs | 14 | Reserved |
| 15 | 4 layer, port 7-10, 24 REs | 15 | Reserved |

Referring to the table 16, the sequence generation value does not indicate the scrambling identifier. That is, the scrambling identifier is not used to generate a DMRS sequence. However, the number of resource elements is indicated by all sequence generation values. That is, the sequence generation values 0~15 differently indicate a combination of the antenna port number, the number of layers, and the number of resource elements.

Hereinafter, a method of transmitting a CSI-RS using a multiple antenna, a method of feedbacking a PMI, and a method of transmitting a DMRS will be described. First, the method of transmitting a CSI-RS using a multiple antenna and the method of feedbacking a PMI will be described.

FIG. 9 is a scheme diagram illustrating a method for transmitting a CSI-RS according to an example of the present invention.

Referring to FIG. 9, the double CSI-RS configuration information includes individual CSI-RS configuration information individually defined with respect to the horizontal antenna port and a vertical antenna port and a common CSI-RS configuration information commonly defined in the horizontal antenna port and a vertical antenna port. First, the individual CSI-RS configuration information may be classified into individual CRI-RS configuration information regarding the horizontal antenna port as listed in a following table 17 and individual CRI-RS configuration information regarding the vertical antenna port as listed in a following table 18.

TABLE 17

| | Information field |
| --- | --- |
| Individual CSI-RS configuration information on the horizontal antenna port | Antenna port count (antennaPortsCount): of antenna ports to transmit CSI-RS |
| | Resource configuration(ResourceConfig): CSI-RS pattern<br>Sub-frame configuration (SubframeConfig): indicates a sub-frame to transmit a CSI-RS<br>Antenna port index (antennaPortIndex): indicates a horizontal antenna port number mapped to a cross point antenna |

TABLE 18

| | Information field |
| --- | --- |
| Individual CSI-RS configuration information on the vertical antenna port | Antenna port count (antennaPortsCount): of antenna ports to transmit CSI-RS |
| | Resource configuration(ResourceConfig): CSI-RS pattern<br>Sub-frame configuration (SubframeConfig): indicates a sub-frame to transmit a CSI-RS<br>Antenna port index (antennaPortIndex): indicates a vertical antenna port number mapped to a cross point antenna |

Referring to the table 17 and the table 18, the CSI-RS configuration information includes antenna port count antennaPortsCount information field, a resource configuration (ResourceConfig) information field, a sub-frame configuration subframeConfig information field, and an antenna port index antebbaPortIndex. The antenna port count information field indicates the number of the antenna ports to transmit the CSI-RS. The resource configuration information field indicates the CSI-RS pattern. Total 32 types of CSI-RS patterns may be given based on maximum 8 supported representative antennas in each direction. In order to express 32 CSI-RS patterns, a resource configuration information field is 5 bit information. The sub-frame configuration information field indicates a sub-frame to transmit the CRS-RS.

The antenna port index information field included in the individual CSI-RS configuration information on the horizontal antenna port indicates a horizontal antenna port mapped to a cross point antenna. In contrast, an antenna port index information field included in the individual CSI-RS configuration information on the vertical antenna port indicates a vertical antenna port mapped to the cross point antenna. Channel estimation performance in the cross point antenna in the cross point antenna is more exact and precision of reference signal received power (RSRP) measurement may be improved by transmitting two CSI-RSs with respect to one cross point antenna.

Next, for example, the common CSI-RS configuration information is defined as listed in a following table 19.

TABLE 19

| | Information field |
|---|---|
| Common CSI-RS configuration information | $N_{ID}^{CSI}$: virtual cell ID for initial CSI-RS scrambling state |
| | $P_C$: ratio of CSI-RS EPRE estimated by UE to PDSCH EPRE |

Referring to the table 19, the common CSI-RS configuration information includes an NCSIID information field and a Pc information field. The NCSIID information field indicates a virtual cell ID for an initial CSI-RS scrambling state. Further, the Pc information field represents an assumed ratio of energy per resource element (EPRE) of PDSCH to energy per CSI-RS resource element (EPRE). A value of the Pc has a range of [−8, 15] dB, and is increased/reduced at a 1 dB interval.

The UE receives the double CSI-RS configuration information, and reconfigures (or changes) an upper layer, for example, the CSI-RS configuration (S905). The process of reconfiguring the CSI-RS configuration may be performed when the UE reconfigures RRC connection. For example, the UE receives an RRC connection reconfiguration message including the double CSI-RS configuration information from the base station, terminates step S905, and transmits an RRC connection reconfiguration termination message to the base station.

The base station transmits the double CSI-RS to the UE based on the individual CSI-RS configuration information and the common CSI-RS configuration information (S910). The step of transmitting the double CSI-RS includes a step where the base station transmits the CSI-RS1 to the UE through a horizontal antenna port, and transmits the CSI-RS2 to the UE through a vertical antenna port. The double CSI-RSs may be included in a non-zero CSI-RS.

In detail, a step of transmitting the CSI-RS1 by the base station includes a step of transmitting the CSI-RS1 to the UE in a predetermined sub-frame S1 based on a CSI-RS pattern 1 configured with respect to the horizontal antenna port and the number N1 of the antenna ports. Further, a step of transmitting the CSI-RS2 by the base station includes a step of transmitting the CSI-RS2 to the UE in a predetermined sub-frame S2 based on a CSI-RS pattern 2 configured with respect to the vertical antenna port and the number N2 of antenna ports. In this case, the base station may transmit the CSI-RS1 and the CSI-RS2 through the same cross point antenna. Accordingly, the horizontal antenna port and the vertical antenna port are simultaneously mapped to the cross point antenna. In this case, the CSI-RS patterns 1 and 2, the numbers N1 and N2 of antenna ports, sub-frames S1 and S2, and an antenna port index mapped to a cross point are previously configured according to the double CSI-RS configuration information before transmitting the CSI-RS1 and the CSI-RS2.

In the side of the UE, the UE receives the double CSI-RS from the base station based on the double CSI-RS configuration information.

The UE performs channel estimation based on the double CSI-RS, and acquires a channel $H^H$ with respect to the horizontal antenna port and a channel $H^V$ with respect to the vertical antenna port as the result (S915). Further, the UE selects an optimal codebook with respect to each channel using the equation 3 to the equation 10 (S920).

For example, the UE multiplies the channel $H^H$ as illustrated in the equation 11 by a codebook according to each layer as illustrated in the equations 3 to 10, and may select a codebook having a maximum value among the codebooks as a codebook 1 with respect to the horizontal beamforming. Moreover, the UE multiplies the channel $H^V$ as illustrated in the equation 12 by a codebook according to each layer as illustrated in the equations 3 to 10, and may select a codebook having a maximum value among the codebooks as a codebook 2 with respect to the vertical beamforming.

The UE generates a double PMI indicating an optimal codebook selected with respect to each channel to transmit the double PMI to the base station (S925). The double PMI includes a PMI1 indicating the codebook 1 and a PMI2 indicating the codebook 2. The PMI1 corresponds to a CSI-RS of the horizontal antenna port, and the PMI2 corresponds to a CSI-RS of the vertical antenna port. Beamforming of a two-dimensional plane may be supported for all directions according to the double PMI.

If the base station receives double PMI feedback from the UE, the base station determines whether to perform precoding based on one PMI of the double PMI (S930). As a method therefor, a scheme of sharing a rank R having the same kronecker product or double PMI may be used. In this way, the codebook is designed with respect to 2, 4, and 8 transmission antennas. The present embodiment designs a codebook with respect to 8 transmission antennas as a double PMI with respect to the antenna configuration as illustrated in FIG. 5.

In addition, the base station transmits precoded data to the UE based on a determined PMI (S935).

Figure 10:
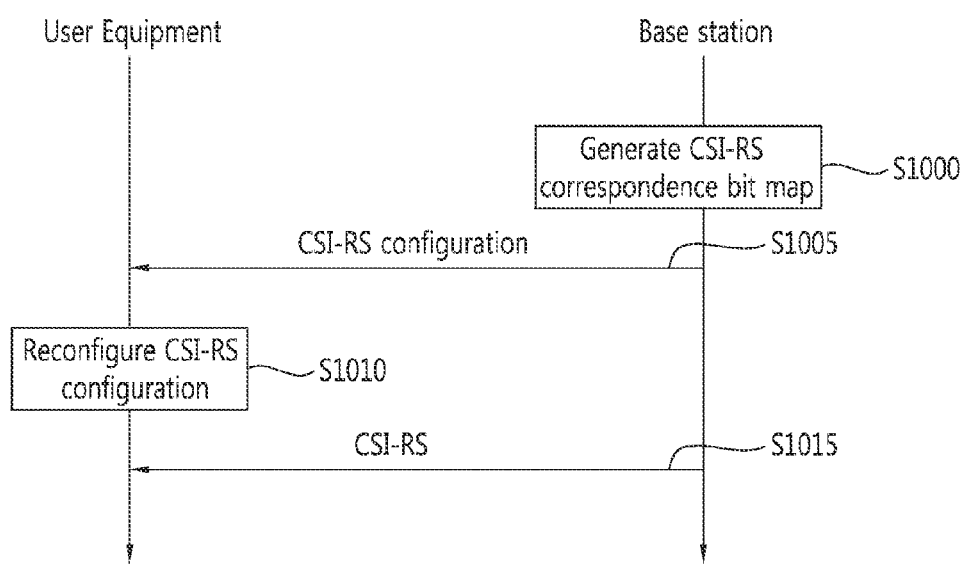
FIG. 10 is a scheme diagram illustrating a method for transmitting a CSI-RS according to another example of the present invention.

FIG. 10 is a scheme diagram illustrating a method for transmitting a CSI-RS according to another example of the present invention. FIG. 10 premises a scenario where all antennas transmit a CSI-RS in an antenna system on a two-dimensional plane. When 64 antennas transmit a CSI-RS, since there is a need for maximum 64 antenna ports or maximum 64 CSI-RS patterns, a method of compactly generating or configuring the CSI-RS configuration information is disclosed.

Referring to FIG. 10, the base station generates a CSI-RS correspondence indicating a corresponding CSI-RS pattern in q antenna port units (S1000). A length of the CSI-RS correspondence bit map is n bits. In this case, the n represents the number of supportable CSI-RS patterns. Details of the CSI-RS correspondence bit map are equally applied as illustrated in FIG. 6 and FIG. 7.

The base station transmits CSI-RS configuration information including the CSI-RS correspondence bit map to the UE (S1005). In this way, antenna ports used to transmit by CSI-RS patterns are previously defined with a predetermined number, there is no need for signaling to inform the number of antenna ports according to each pattern. The CSI-RS configuration may be reduced in a compact form as listed in a following table 20.

TABLE 20

| | Information field |
|---|---|
| CSI-RS configuration information | CSI-RS correspondence bit map: each bit corresponds to a CSI-RS pattern as 5 bits. If a bit value is 1, the bit value indicates that a corresponding CSI-RS pattern is used. If the bit value is 0, the bit value indicated that the CSI-RS pattern is not used |
| | Sub-frame configuration (subframeConfig): indicates a sub-frame to transmit CSI-RS |
| | $N_{ID}^{CSI}$: virtual cell ID for initial CSI-RS scrambling state |
| | $P_C$: ratio of CSI-RS EPRE estimated by UE to PDSCH EPRE |

Referring to the table 20, the CSI-RS configuration information includes a CSI-RS correspondence bit map, a subframe configuration information field, an NCSIID information field, and a Pc information field. Contents of each information field are as described above.

The UE receives the CSI-RS configuration information, and reconfigures (changes) an upper layer, for example, a CSI-RS configuration using the received CSI-RS configuration information (S1010). The step of reconfiguring the CSI-RS configuration may be included in a process of reconfiguring the RRC connection by the UE to be performed. For example, the UE receives an RRC connection reconfiguration message including the double CSI-RS configuration information from the base station, terminates step S1010, and transmits the RRC connection reconfiguration termination message to the base station.

The base station confirms at least one selected CSI-RS pattern (CSI-RS pattern corresponding to a bit having a value of 1), and transmit a CSI-RS to the UE using q antenna ports corresponding to every CSI-RS pattern (S1015). Further, the UE receives the CSI-RS from the base station based on a CSI-RS pattern determined by antenna ports based on the reconfigured CSI-RS configuration.

Figure 11:
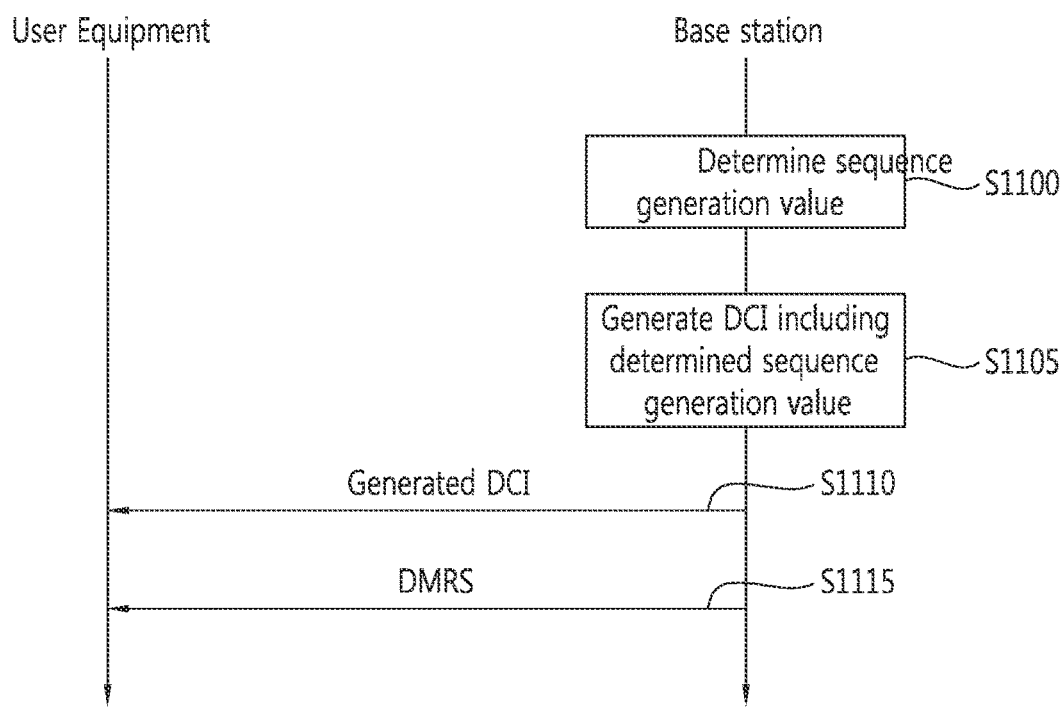
FIG. 11 is a flowchart illustrating a method for transmitting a DMRS according to an example of the present invention.

FIG. 11 is a flowchart illustrating a method for transmitting a DMRS according to an example of the present invention.

Referring to FIG. 11, a base station determines a sequence generation value (S1100).

For example, when maximum two layers per UE are supported in a multiple user MIMO mode, for example, the sequence generation value may be defined as indication as listed in the table 13. In the table 13, sequence generation values 0~7 include the same two combinations of the number of layers, the antenna port number, and the scrambling identifier. For example, the sequence generation value 0 and the sequence generation value 4 include the same number of layers, the same antenna port number, and the scrambling identifier. Accordingly, in order to identify them, the number of resource elements is used. Meanwhile, the sequence generation values do not include a case where there is no the same combination of the number of layers, the antenna port number, and the scrambling identifier. Accordingly, when two UEs are operated in the multiple users MIMO mode, and a DMRS with only one layer is transmitted to both of the two UEs, the base station may determine the sequence generation value so that the number of resource elements are differently set every to two UEs in order to ensure the orthogonality of the DMRS with respect to the two UEs.

As another example, when maximum four layers per UE are supported in the multiple user MIMO mode, for example, the sequence generation value may be defined as indication as listed in the table 14.

The base station generates a DCI including the determined sequence generation value (S1105). The sequence generation value may indicate a combination of the antenna port number, the scrambling identifier, the number of layers, and the number of resource elements, and for example may be 4 bit information. Further, the DCI including the above sequence generation value may be defined as listed in the table 12. However, the information fields included in the table 12 are illustrative purpose only and a technical scope of the present invention includes a DCI in the form to which a new information field is added except for the information fields as well as a DCI in the form from which at least one information field is omitted. The number of resource elements indicates the number of resource elements used to transmit the DMRS. Since the sequence generation value is 4 bits, the sequence generation value indicates total 16 types.

A maximum number of layers for the DMRS is 8 with respect to a single user MIMO, maximum 8 UEs may be supported with respect to the multiple user MIMO. Associated with the maximum number of layers per UE in a multiple user MIMO mode, the present embodiment includes both a case where the base station and the UE support maximum two layers and a case where the base station and the UE support maximum four layers.

The base station maps a DCI including the determined sequence generation value to transmit the mapped result to the UE (S1110). The UE monitors a PDCCH to which the DCI is mapped in order to receive the DCI from the base station. If the UE successfully decodes the PDCCH, the UE acquires the DCI. Further, the UE analyzes information fields in the DCI to confirm at least one of the number of layers indicated by the sequence generation value, an antenna port number, a scrambling identifier, and the number of resource elements.

The base station transmits the DMRS to the UE using a DMRS sequence determined based on the sequence generation value (S1115). The UE confirms a DMRS sequence using at least one of the number of layers indicated by the sequence generation value, an antenna port number, a scrambling identifier, and the number of resource elements to receive the DMRS from the base station using the DMRS sequence.

Accordingly, since orthogonality between DMRSs may maintain even if a transmission amount of the DMRS in the multiple user MIMO operation is increased and there is no ambiguity of mapping for the DMRS, the UE may identify respective DMRSs.

Figure 12:
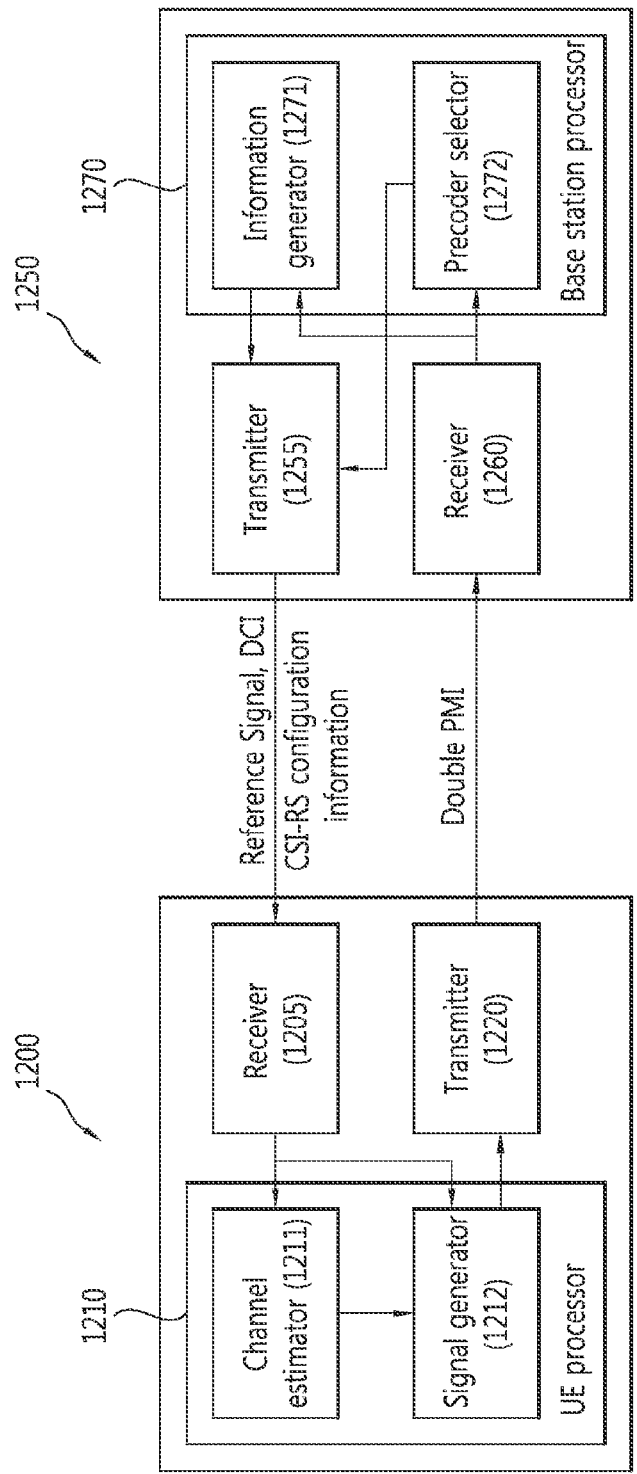
FIG. 12 is a block diagram illustrating user equipment (UE) and a base station according to an exemplary embodiment of the present invention.

FIG. 12 is a block diagram illustrating user equipment (UE) and a base station according to an exemplary embodiment of the present invention.

Referring to FIG. 12, UE 1200 includes a receiver 1205, a UE processor 1210, and a transmitter 1220. The UE processor 1210 includes a channel estimator 1211 and a signal generator 1212.

The receiver 1205 receives a reference signal, a DCI, and CSI-RS configuration information. In this case, the reference signal includes at least one of a CSI-RS, a double CSI-RS, and a DMRS. The DCI includes a sequence generation value field.

The channel estimator 1211 estimates a channel using a double CSI-RS.

For example, the channel estimator 1211 performs channel estimation based on the double CSI-RS, and acquires a channel $H^H$ with respect to a horizontal antenna port and a channel $H^V$ with respect to a vertical antenna port. Further, the channel estimator 1211 selects an optimal codebook with respect to each channel using the equation 3 to the equation 10. For example, the channel estimator 1211 may multiply a channel $H^H$ as illustrated in the equation 11 by a codebook according to each layer as illustrated in the equations 3 to 10, and may select a codebook having a maximum value among codebooks as a codebook 1 with respect to horizontal beamforming. Further, the channel estimator 1211 may multiply a channel $H^V$ as illustrated in the equation 12 by a codebook according to each layer as illustrated in the equations 3 to 10, and may select a codebook having a maximum value among codebooks as a codebook 2 with respect to vertical beamforming.

The signal generator 1212 generates a double PMI indicating an optimal codebook selected with respect to each channel to transmit the generated double PMI to the transmitter 1220. Then, the transmitter 1220 transmits the double PMI to the base station 1250. The double PMI includes a PMI1 indicating a codebook 1 and a PMI2 indicating a codebook 2. The PMI1 corresponds to a CSI-RS of a horizontal antenna port. The PMI2 corresponds to a CSI-RS of the vertical antenna port. The beamforming on a two-dimensional plane with respect to all directions may be supported according to the above double PMI.

As another example, the channel estimator 1211 analyzes the CSI-RS configuration information, and reconfigures (or changes) an upper layer, for example, the CSI-RS configuration using a CSI-RS correspondence bit map included in the CSI-RS configuration information. Further, the receiver 1205 receives a CSI-RS from the base station 1250 based on the CSI-RS pattern determined by antenna patterns on the basis of the reconfigured CSI-RS configuration.

As another example, the receiver 1205 monitors the PDCCH to which a DCI is mapped in order to receive a DCI from the base station 1250. If the receiver 1250 successfully decodes the PDCCH, the receiver 1250 acquires the DCI. Further, the receiver 1205 analyzes information fields in the DCI to confirm at least one of the number of layers indicated by the sequence generation value, an antenna port number, a scrambling identifier, and the number of resource elements. Moreover, the receiver 1205 confirms a DMRS sequence using at least one of the number of layers indicated by the sequence generation value, the antenna port number, the scrambling identifier, and the number of resource elements, and receives the DMRS from the base station 1250 using the confirmed DMRS sequence.

The base station 1250 includes a plurality of transmission antennas (not shown), a transmitter 1255, a receiver 1260, and a base station processor 1270. The base station processor 1270 includes an information generator 1271 and a precoder selector 1272.

The transmitter 1255 transmits a reference signal, a DCI, CSI-RS configuration information, and the like to the UE 1200. The above signals and information may be transmitted through a plurality of transmission antennas. The plurality of transmission antennas may be included in a vertical antenna port or a horizontal antenna port, respectively. In this case, the reference signal includes at least one of the CSI-RS, the double CSI-RS, and a DMRS. The DCI includes a sequence generation value field. The CSI-RS configuration information may include double CSI-RS configuration information or a CSI-RS correspondence bit map.

For example, if the information generator 1271 generates the double CSI-RS configuration information to transmit the generated double CSI-RS configuration information, the transmitted 1255 transmits the double CSI-RS configuration information to the UE 1200. Further, the transmitter 1255 transmits the double CSI-RS to the UE 1200. For example, the step of transmitting the double CSI includes a step of transmitting the CSI-RS1 to the UE 1200 through the horizontal antenna port by the transmitter 1255 and a step of transmitting the CSI-RS2 through the vertical antenna port. The double CSI-RSs may be included in a non-zero CSI-RS. In detail, the step of transmitting the CSI-RS1 by the transmitter 1255 transmits the CSI-RS1 to the UE 1200 in a determined sub-frame S1 based on a CSI-RS pattern 1 and the number N1 of the antenna ports configured with respect to the horizontal antenna port. In addition, the step of transmitting the CSI-RS2 by the transmitter 1255 transmits the CSI-RS2 to the UE 1200 in a determined sub-frame S2 based on a CSI-RS pattern 2 and the number N1 of the antenna ports configured with respect to the vertical antenna port. In this case, the transmitter 1255 may transmit the CSI-RS1 and the CSI-RS2 through the same one cross point antenna. Accordingly, the horizontal antenna port and the vertical antenna port are simultaneously mapped to the cross point antenna. In this case, CSI-RS patterns 1 and 2, the numbers N1 and N2 of antenna ports, sub-frames S1 및 S2, an antenna port index mapped to a cross point are previously configured by the double CSI-RS configuration information before transmitting the CSI-RS1 and the CSI-RS2.

The receiver 1260 receives the double PMI with respect to the double CSI-RS from the UE 1200. If the receiver 1260 receives the double PMI feedback from the UE 1200, the precoder selector 1272 determines whether to perform precoding based on one PMI of the double PMI. As the method therefor, the disclosed kronecker product or the double PMI may share the same rank R. In this way, a codebook is designed with respect to 2, 4, and 8 transmission antennas. The present embodiment designs a codebook as a double PMI regarding an antenna arrangement as illustrated in FIG. 5 with respect to 8 transmission antennas. Furthermore, the precoder selector 1272 generates precoded data based on the determined PMI, and the transmitter 1255 transmits the precoded data to the UE 1200.

As another example, if the information generator 1271 generates CSI-RS configuration information including the CSI-RS correspondence bit map to transmit the generated CSI-RS configuration information, the transmitter 1255 transmits the CSI-RS configuration information to the UE 1200. In addition, the transmitter 1255 confirms at least one selected CSI-RS pattern (CSI-RS pattern corresponding to a bit having a value of 1), and transmits the CSI-RS to the UE 1200 using q antenna ports corresponding to every CSI-RS pattern.

As another example, if the information generator 1271 generates a DCI including the sequence generation value, the transmitter 1255 maps the DCI to the PDCCH to transmit the mapping result to the UE 1200. Further, the transmitter 1255 transmits the DMRS to the UE 1200 using the DMRS sequence determined based on the sequence generation value. Accordingly, although a transmission amount of the DMRS is increased in the multiple user MIMO operation, orthogonality between DMRSs may maintain. Since there is no ambiguity of mapping for the DMRS, the UE 1200 may identify each DMRS.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. A method of receiving a reference signal (RS) by user equipment (UE) in a multiple antenna system, the method comprising:

defining, at a base station comprising an antenna array, a horizontal representative antenna consisting of a plurality of physical antennas close to an x-axis direction and a vertical representative antenna consisting of a plurality of physical antennas close to a y-axis direction;

receiving, from the base station, channel state information consisting of a first channel state information reference signal (CSI-RS) configuration information including a first individual parameter used for the UE to receive a first CSI-RS from the horizontal representative antenna and a second CSI-RS configuration information including a second individual parameter used for the UE to receive a second CSI-RS from the vertical representative antenna among all of the transmission antennas of the base station to reduce CSI-RS overhead; and receiving the first CSI-RS and the second CSI-RS based on the first and second CSI-RS configuration information, respectively, wherein the first and second CSI-RS configuration information comprise an antenna port count information, a resource configuration information, a sub-frame configuration information, and an antenna port index, wherein the first individual parameter used to receive the first CSI-RS comprises a number of an antenna port which is mapped to the vertical representative antenna, from among antenna ports mapped to the horizontal representative antenna, and wherein a Radio Resource Configuration (RRC) connection reconfiguration message includes the first and second CSI-RS configuration information.

2. The method of claim 1, further comprising reconfiguring a CSI-RS configuration regarding the UE based on the first and second CSI-RS configuration information.

3. The method of claim 1, further comprising:
estimating a first channel using the first CSI-RS;
estimating a second channel using the second CSI-RS;
generating a first precoding matrix indicator (PMI) corresponding to the first estimated channel and a second PMI corresponding to the second estimated channel; and
transmitting the first PMI and the second PMI to the base station.

4. A user equipment (UE) for receiving a reference signal (RS) in a multiple antenna system, the UE comprising:
a receiver to receive, from a base station, channel state information consisting of a first channel state information reference signal (CSI-RS) configuration information including first individual parameter used for the UE to receive a first CSI-RS from an horizontal representative antenna and a second CSI-RS configuration information including a second individual parameter used for the UE to receive a second CSI-RS from an vertical representative antenna among all of the transmission antennas of the base station to reduce CSI-RS overhead, wherein the base station comprises an antenna array wherein the horizontal representative antenna consists of a plurality of physical antennas close to an x-axis direction and the vertical representative antenna consists of a plurality of physical antennas close to a y-axis direction; and
a channel estimator to reconfigure a CSI-RS configuration regarding the UE based on the first and second CSI-RS configuration information,
wherein the receiver receives the first CSI-RS and the second CSI-RS based on the first and second CSI-RS configuration information, respectively, from the base station,
wherein the first and second CSI-RS configuration information comprise an antenna port count information, a resource configuration information, a sub-frame configuration information, and an antenna port index,
wherein the first individual parameter used to receive the first CSI-RS comprises the number of an antenna port which is mapped to the vertical representative antenna, from among antenna ports mapped to the horizontal representative antenna, and
wherein a Radio Resource Configuration (RRC) connection reconfiguration message includes the first and second CSI-RS configuration information.

5. The UE of claim 4, wherein the channel estimator estimates a first channel using the first CSI-RS, and estimates a second channel using the second CSI-RS,
the UE further comprises a signal generator to generate a first precoding matrix indicator (PMI) corresponding to the first estimated channel and a second PMI corresponding to the second estimated channel, and
the receiver transmits the first PMI and the second PMI to the base station.

6. A method of transmitting a reference signal (RS) by a base station in a multiple antenna system, the method comprising:
defining a horizontal representative antenna consisting of a plurality of physical antennas close to an x-axis direction of an antenna array and a vertical representative antenna consisting of a plurality of physical antennas close to a y-axis direction of the antenna array;
generating channel state information consisting of a first channel state information reference signal (CSI-RS) configuration information including a first individual parameter used for a user equipment (UE) to receive a first CSI-RS from the horizontal representative antenna and a second CSI-RS configuration information including a second individual parameter used for the UE to receive a second CSI-RS from the vertical representative antenna among all of the transmission antennas of a base station to reduce CSI- RS overhead;
transmitting the first and second CSI-RS configuration information to the UE; and
transmitting the first CSI-RS and the second CSI-RS to the UE based on the first and second CSI-RS configuration information, respectively,
wherein the first and second CSI-RS configuration information comprise an antenna port count information, a resource configuration information, a sub-frame configuration information, and an antenna port index,
wherein the first individual parameter used to transmit the first CSI-RS comprises the number of an antenna port which is mapped to the vertical representative antenna, from among antenna ports mapped to the horizontal representative antenna, and
wherein a Radio Resource Configuration (RRC) connection reconfiguration message includes the first and second CSI-RS configuration information.

7. The method of claim 6, further comprising the UE reconfiguring a CSI-RS configuration regarding the UE based on the first and second CSI-RS configuration information.

8. The method of claim 6, further comprising: receiving a first precoding matrix indicator (PMI) corresponding to a first estimated channel estimated according to the first CSI-RS and a second PMI corresponding to a second estimated channel estimated according to the second CSI-RS.

9. A base station for transmitting a reference signal (RS) in a multiple antenna system, the base station comprising:
transmission antennas;
an information generator to generate channel state information consisting of a first channel state information reference signal (CSI-RS) configuration information including a first individual parameter used for a user equipment (UE) to receive a first CSI-RS from an horizontal representative antenna and a second CSI-RS configuration information including a second individual parameter used for the UE to receive a second CSI-RS from an vertical representative antenna among the transmission antennas to reduce CSI-RS overhead, wherein the horizontal representative antenna consists of a plurality of physical antennas close to an x-axis direction and the vertical representative antenna consists of a plurality of physical antennas close to a y-axis direction; and a transmitter to transmit the first and second CSI-RS configuration information to the UE, and to transmit the first CSI-RS and the second CSI-RS to the UE based on the first and second CSI-RS configuration information, respectively, wherein the first and second CSI-RS configuration information comprise an antenna port count information, a resource configuration information, a sub-frame configuration information, and an antenna port index, wherein the first individual parameter used to receive the first CSI-RS comprises the number of an antenna port which is mapped to the vertical representative antenna, from among antenna ports mapped to the horizontal representative antenna, and wherein a Radio Resource Configuration (RRC) connection reconfiguration message includes the first and second CSI-RS configuration information.

10. The base station of claim 9, further comprising: a receiver to receive a first precoding matrix indicator (PMI) corresponding to a first estimated channel estimated according to the first CSI-RS and a second PMI corresponding to a second estimated channel estimated according to the second CSI-RS from the UE.

11. The base station of claim 10, further comprising a precoder selector to determine whether to perform precoding based on one of the first PMI and the second PMI.

* * * * *